United States Patent
Yoshida et al.

(10) Patent No.: US 11,275,095 B2
(45) Date of Patent: Mar. 15, 2022

(54) SAMPLE PRETREATMENT APPARATUS, ROBOTIC ARM, AND SAMPLE PRETREATMENT METHOD

(71) Applicants: SYSMEX CORPORATION, Kobe (JP); KAWASAKI JUKOGYO KABUSHIKI KAISHA, Kobe (JP)

(72) Inventors: Takashi Yoshida, Kobe (JP); Hiroaki Inokuchi, Kobe (JP); Takehiro Hasegawa, Kobe (JP); Chikako Murata, Kobe (JP); Yukio Iwasaki, Kobe (JP); Satoshi Ouchi, Kobe (JP)

(73) Assignees: SYSMEX CORPORATION, Kobe (JP); KAWASAKI JUKOGYO KABUSHIKI KAISHA, Kobe (JP)

( * ) Notice: Subject to any disclaimer, the term of this patent is extended or adjusted under 35 U.S.C. 154(b) by 218 days.

(21) Appl. No.: 16/367,297

(22) Filed: Mar. 28, 2019

(65) Prior Publication Data
US 2019/0302135 A1 Oct. 3, 2019

(30) Foreign Application Priority Data
Mar. 29, 2018 (JP) .............................. JP2018-064942

(51) Int. Cl.
*G01N 35/00* (2006.01)
*G01N 35/10* (2006.01)
(52) U.S. Cl.
CPC ..... *G01N 35/0099* (2013.01); *G01N 35/1002* (2013.01); *G01N 2035/00346* (2013.01); *G01N 2035/00495* (2013.01)
(58) Field of Classification Search
CPC ..... G01N 35/1002; G01N 2035/00495; G01N 35/0099; G01N 2035/00346
See application file for complete search history.

(56) References Cited

U.S. PATENT DOCUMENTS 6,293,750 B1 9/2001 Cohen et al.
8,926,903 B2 * 1/2015 Nogami ................. G01N 1/405
422/67

(Continued)

FOREIGN PATENT DOCUMENTS

| JP | S53-23691 A | 3/1978 |
| JP | H11-160323 A | 6/1999 |
| JP | 2000-52288 A | 2/2000 |
| JP | 2010-127681 A | 6/2010 |

(Continued)

OTHER PUBLICATIONS

The extended European search report dated Jul. 25, 2019 in a counterpart European patent application.

(Continued)

*Primary Examiner* — Shogo Sasaki
(74) *Attorney, Agent, or Firm* — Metrolex IP Law Group, PLLC

(57) ABSTRACT

A sample pretreatment apparatus includes: a plurality of sample pretreatment sections, each of which executes a sample pretreatment prior to a measurement; and a robotic arm including: an articulated arm member; and a hand attached to the articulated arm member. The plurality of sample pretreatment sections includes a sample dispenser that dispenses a sample in a first sample container into a second sample container. For a first measurement, the robotic arm holds the second sample container with the hand and transports the second sample container to a pretreatment group of the plurality of sample pretreatment sections, the pretreatment group including the sample dispenser. For a second measurement, the robotic arm holds the second sample container with the hand and transports the second sample container to another pretreatment group of the plurality of sample pretreatment sections, the another pretreatment group including the sample dispenser.

19 Claims, 23 Drawing Sheets

(56) References Cited

U.S. PATENT DOCUMENTS

| | | | |
|---|---|---|---|
| 2004/0181050 A1* | 9/2004 | Shoji | B01L 3/0275 |
| | | | 536/25.4 |
| 2005/0013736 A1* | 1/2005 | McKeever | G01N 35/0092 |
| | | | 422/63 |
| 2005/0175506 A1* | 8/2005 | Matsubara | G01N 35/026 |
| | | | 422/68.1 |
| 2012/0020838 A1 | 1/2012 | Mimura et al. | |
| 2012/0122078 A1 | 5/2012 | Patterson | |
| 2012/0134896 A1 | 5/2012 | Chiyajo et al. | |
| 2014/0036276 A1 | 2/2014 | Gross et al. | |
| 2014/0073043 A1 | 3/2014 | Holmes | |
| 2015/0111198 A1 | 4/2015 | Brisebat et al. | |
| 2015/0316569 A1* | 11/2015 | Fujita | G01N 35/00584 |
| | | | 422/67 |
| 2017/0217027 A1 | 8/2017 | Boucard | |

FOREIGN PATENT DOCUMENTS

| | | |
|---|---|---|
| JP | 2010-137339 A | 6/2010 |
| JP | 2012-117878 A | 6/2012 |
| JP | 2013-542452 A | 11/2013 |
| JP | 2015-047641 A | 3/2015 |
| JP | 2015-509601 A | 3/2015 |
| JP | 2016-510418 A | 4/2016 |
| WO | 2010/117044 A1 | 10/2010 |
| WO | 2012/065004 A2 | 5/2012 |
| WO | 2014127379 A1 | 8/2014 |

OTHER PUBLICATIONS

Office Action dated Sep. 23, 2021 in a counterpart European patent application.

Office Action "JPOA" dated Jan. 25, 2022 in a counterpart Japanese patent application.

* cited by examiner

POSITION INFORMATION TABLE

| | BAR CODE READING (VIAL) | AGITATING (VIAL) | OPENING (VIAL) | DISPENSING POSITION (VIAL) | INPUT POSITION (SMEAR PREPARING) | INPUT (CENTRIFUGE TUBE) | INFORMATION ATTACHING PART (CENTRIFUGE TUBE) | DISPENSING POSITION (CENTRIFUGE TUBE 1) | DISPENSING POSITION (CENTRIFUGE TUBE 2) | CENTRIFUGATION (CENTRIFUGE TUBE 1) | OPENING (CENTRIFUGE TUBE 2) | INPUT (HPV) | INPUT (EXFOLIATED CELL) |
|---|---|---|---|---|---|---|---|---|---|---|---|---|---|
| 1 | A | O | O | (X1,Y1,Z1) | (Xa,Ya,Za) | O | O | (X4,Y4,Z4) | (X7,Y7,Z7) | O | O | O | O |
| 2 | B | O | O | (X2,Y2,Z2) | (Xb,Yb,Zb) | O | O | (X5,Y5,Z5) | (X8,Y8,Z8) | O | O | O | O |
| 3 | C | O | O | (X3,Y3,Z3) | (Xc,Yc,Zc) | O | O | (X6,Y6,Z6) | (X9,Y9,Z9) | O | O | O | O |
| ... | ... | ... | ... | ... | ... | ... | ... | ... | ... | ... | ... | ... | ... |

| | UTERINE CERVIX SAMPLE STOCK SOLUTION | EXFOLIATED CELL MEASUREMENT CENTRIFUGE TUBE | HPV MEASUREMENT CENTRIFUGE TUBE |
|---|---|---|---|
| | ⟶ | —·—·⟶ | ------⟶ |
| 1 | SAMPLE INPUTTING PART | CENTRIFUGE TUBE INPUTTING PART | – |
| 2 | READER | TRANSPORT BY SECOND ROBOT | – |
| 3 | TRANSPORT BY FIRST ROBOT | INFORMATION ATTACHING PART | – |
| 4 | AGITATOR | TRANSPORT BY SECOND ROBOT | CENTRIFUGE TUBE INPUTTING PART |
| 5 | TRANSPORT BY FIRST ROBOT | DISPENSER (WAITING) | TRANSPORT BY SECOND ROBOT |
| 6 | OPENING PART | | INFORMATION ATTACHING PART |
| 7 | TRANSPORT BY FIRST ROBOT | | TRANSPORT BY SECOND ROBOT |
| 8 | DISPENSER | | |
| 9 | MOVE | MOVE TO TRANSPORT POSITION | MOVE TO TRANSPORT POSITION |
| 10 | CLOSING PART | TRANSPORT BY SECOND ROBOT | PLUG INPUTTING PART |
| 11 | SMEAR PREPARING INPUTTING PART | CENTRIFUGE | TRANSPORT BY FIRST ROBOT |
| 12 | – | TRANSPORT BY SECOND ROBOT | CLOSING PART |
| 13 | – | DISPENSER (SUPERNATANT REMOVING) | HPV INPUTTING PART |
| 14 | – | TO EXFOLIATED CELL MEASUREMENT INPUTTING RACK | – |

SAMPLE PRETREATMENT APPARATUS, ROBOTIC ARM, AND SAMPLE PRETREATMENT METHOD

CROSS REFERENCE TO RELATED APPLICATIONS

This application claims priority from to prior Japanese Patent Application No. 2018-064942 filed with the Japan Patent Office on Mar. 29, 2018, the entire contents of which are incorporated herein by reference.

BACKGROUND

The disclosure relates to a sample pretreatment apparatus, a robotic arm, and a sample pretreatment method.

Conventionally, it has been known to perform several kinds of measurements on samples from the same subject. For example, Japanese Patent Application Publication (Japanese Translation of PCT International Application) No. 2013-542452 ("Patent Literature 1") teaches that a test of cervical cancer involves a measurement of the morphology of cells and a measurement of a biomarker. In this test of cervical cancer, as sample pretreatments before the test, sample pretreatments such as preparation of samples for the respective measurements, a centrifugation process and removing an unnecessary component are conducted in accordance with the measurement methods.

However, the test of cervical cancer in Patent Literature 1 requires a user to devote considerable time and effort to separately prepare samples for respective tests, and perform sample pretreatments appropriate for the respective tests. Moreover, when some components derived from the user are mixed into the sample while the user manually performs the sample pretreatment, those components may have different influences on the test methods. In the test of cervical cancer in Patent Literature 1, a test of a cell morphology and a test of a biomarker such as HPV, for example, are performed. A component adhered on the skin of the user, if it is mixed into the samples, has small influence on the test of the cell morphology, but has large influence on the biomarker test where the component from the user is incorrectly measured as the biomarker. For this reason, the correlation between the results of the two tests loses the reliability.

Moreover, in order to increase the flexibility of the system design, there is a demand to use a general-purpose apparatus for sample pretreatments instead of using a dedicated sample pretreatment system integrally constructed.

SUMMARY

A sample pretreatment apparatus according to one or more embodiments may include: a plurality of sample pretreatment sections, each of which executes a sample pretreatment prior to a measurement; and a robotic arm including: an articulated arm member; and a hand attached to the articulated arm member. The plurality of sample pretreatment sections may include a sample dispenser that dispenses a sample in a first sample container into a second sample container. In a case in which the sample dispensed into the second sample container is pretreated for a first measurement, the robotic arm may hold the second sample container with the hand and transport the second sample container to a pretreatment group of the plurality of sample pretreatment sections, the pretreatment group including the sample dispenser. In a case in which the sample dispensed into the second sample container is pretreated for a second measurement, the robotic arm may hold the second sample container with the hand and transport the second sample container to another pretreatment group of the plurality of sample pretreatment sections, the another pretreatment group including the sample dispenser.

A robotic arm according to one or more embodiments performs a sample pretreatment by cooperating with plurality of sample pretreatment sections including a dispenser that dispenses a sample in a first sample container into a second sample container. The robotic arm may include: an articulated arm member; and a hand attached to the articulated arm member. In a case in which the sample dispensed into the second sample container is pretreated for a first measurement, the robotic arm may hold the second sample container with the hand and transport the second sample container to a pretreatment group of the plurality of sample pretreatment sections, the pretreatment group including the dispenser. In a case in which the sample dispensed into the second sample container is pretreated for a second measurement, the robotic arm may hold the second sample container with the hand and transport the second sample container to another pretreatment group of the plurality of sample pretreatment sections, the another pretreatment group including the dispenser.

A sample pretreatment method according to one or more embodiments uses a robotic arm. The sample pretreatment method may include: transporting a first sample container and a second sample container to a dispenser by the robotic arm including an articulated arm member and a hand attached to the articulated arm member, while holding the first container and the second sample container with the hand of the robotic arm; dispensing a sample in the first sample container into the second sample container by the dispenser using the robotic arm; holding the second sample container with the hand and transporting the second sample container to a group of sample pretreatment sections by the robotic arm, in a case in which the sample dispensed into the second sample container is pretreated for a first measurement; and holding the second sample container with the hand and transporting the second sample container to another group of the sample pretreatment sections by the robotic arm, in a case in which the sample dispensed into the second sample container is to be used in a second measurement.

BRIEF DESCRIPTION OF THE DRAWINGS

FIG. 5 is a diagram illustrating a position information table of a sample pretreatment apparatus;

FIG. 11 is a diagram illustrating a process of a sample pretreatment apparatus;

DETAILED DESCRIPTION

Figure 1:
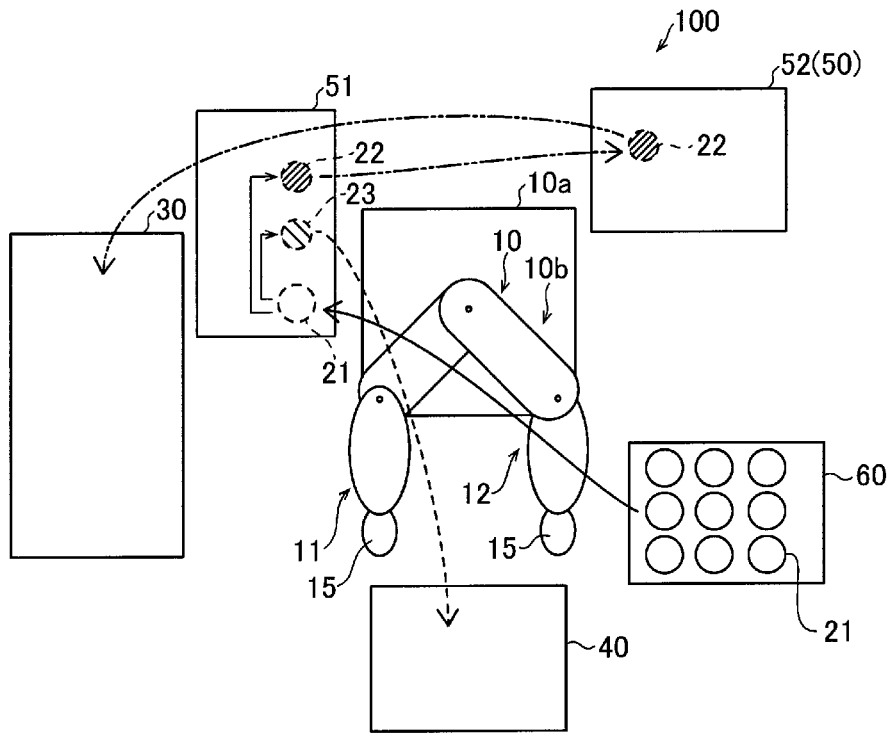
FIG. 1 is a schematic diagram illustrating a sample pretreatment apparatus.

A sample pretreatment apparatus (100) according to a first aspect includes multiple sample pretreatment sections (50) that respectively execute multiple sample pretreatments, and a robotic arm (10) including an articulated arm member (10b) to which a hand (15) is attached. The multiple sample pretreatment sections (50) include a dispenser (51) that dispenses a sample in a first sample container (21) to second sample containers (22, 23). The robotic arm (10) holds the second sample container (22) with hand (15), and transports the second sample container (22) to the sample pretreatment section (50) in one group including the dispenser (51) when the sample dispensed into the second sample container (22) is to be used in one measurement, and holds the second sample container (23) with the hand (15), and transports the second sample container (23) to the sample pretreatment section (50) in another group including the dispenser (51) when the sample dispensed into the second sample container (23) is to be used in another measurement.

The sample pretreatment apparatus (100) according to a first aspect is configured as the above to enable the robotic arm (10) instead of a manual work to transport the second sample containers (22, 23) in order to respectively perform multiple sample pretreatments different from each other. This can reduce a work burden of the user when tests of several types are executed with respect to the sample of the same subject, and can suppress generation of contamination by the mixing of a component derived from the user. Moreover, using the robotic arm (10) having a wide workable range makes it possible to access various kinds of devices and execute sample pretreatments in accordance with measurements. Accordingly, general-purpose devices can be used.

A robotic arm (10) according to a second aspect is the robotic arm (10) that performs a sample pretreatment by cooperating with multiple sample pretreatment sections (50) including at least a dispenser (51) that dispenses a sample in a first sample container (21) into second sample containers (22, 23), and includes an articulated arm member (10b) to which a hand (15) is attached. The robotic arm (10) holds the second sample container (22) with hand (15), and transports the second sample container (22) to the sample pretreatment section (50) in one group including the dispenser (51) when the sample dispensed into the second sample container (22) is to be used in one measurement, and holds the second sample container (23) with the hand (15), and transports the second sample container (23) to the sample pretreatment section (50) in another group including the dispenser (51) when the sample dispensed into the second sample container (23) is to be used in another measurement.

The robotic arm (10) according to a second aspect is configured as the above to enable the robotic arm (10) instead of a manual work to transport the second sample containers (22, 23) in order to respectively perform multiple sample pretreatments different from each other. This can reduce a work burden of the user when tests of several types are executed with respect to the sample of the same subject, and can suppress generation of contamination by the mixing of a component derived from the user. Moreover, using the robotic arm (10) having a wide workable range makes it possible to access various kinds of devices and execute sample pretreatments in accordance with measurements. Accordingly, general-purpose devices can be used.

A sample pretreatment method according to a third aspect is a sample pretreatment method of respectively executing multiple sample pretreatments by a robotic arm (10) including an articulated arm member (10b) to which a hand (15) is attached. The sample pretreatment method includes: transporting, by the robotic arm (10), a first sample container (21) and second sample containers (22, 23) by being held by the hand (15) to the dispenser (51), and causing a sample in the first sample container (21) to be dispensed into the second sample containers (22, 23); and transporting the second sample container (22) by being held by the hand (15) to the sample pretreatment section (50) in one group including the dispenser (51) when the sample dispensed into the second sample container (22) is to be used in one measurement, and transporting the second sample container (23) by being held by the hand (15) to the sample pretreatment section (50) in another group including the dispenser (51) when the sample dispensed into the second sample container (23) is to be used in another measurement.

The sample pretreatment method according to a third aspect is configured as the above to enable the robotic arm (10) instead of a manual work to transport the second sample containers (22, 23) in order to respectively perform multiple sample pretreatments different from each other. This can reduce a work burden of the user when tests of several types are executed with respect to the sample of the same subject, and can suppress generation of contamination by the mixing of a component derived from the user. Moreover, using the robotic arm (10) having a wide workable range makes it possible to access various kinds of devices and execute sample pretreatments in accordance with measurements. Accordingly, general-purpose devices can be used.

According to one or more aspects, it is possible to reduce a work burden of the user when tests of several types are executed with respect to the sample of the same subject, suppress generation of contamination by the mixing of a component derived from the user, and use general-purpose devices.

Hereinafter, embodiments are explained based on the drawings.

(Overview of Sample Pretreatment Apparatus)

With reference to FIG. 1, an overview of a sample pretreatment apparatus 100 is explained.

The sample pretreatment apparatus 100 according to an embodiment performs multiple sample pretreatments. Moreover, the sample pretreatment apparatus 100 is a sample pretreatment apparatus that performs a pretreatment of preparing a sample to be supplied to a first measuring device 30, and a sample to be supplied to a second measuring device 40 that performs measurement relating to that in the first measuring device 30. Note that, in order to perform three types or more of measurements, three or more samples may be prepared by the pretreatment.

A subject is mainly a human, however, an animal other than the human may be used. For example, a sample collected from a patient is measured for a clinical test or a medical study. The sample is derived from a living body. Examples of the sample derived from a living body include blood (whole blood, serum or plasma), urine, or other liquids such as a bodily fluid, or a liquid obtained by subjecting the collected bodily fluid or blood to a prescribed pretreatment. Moreover, the sample may be a part of tissue other than the liquid or the cells, of the subject. The first measuring device 30 and the second measuring device 40 detect objects components that are related to each other in order to detect a specific disease and the like.

The sample pretreatment apparatus 100 includes a robotic arm 10, and multiple sample pretreatment sections 50. The sample pretreatment section 50 includes at least a dispenser 51. Moreover, the sample pretreatment section 50 includes, for example, a centrifuge 52. The sample pretreatment apparatus 100 includes a supplying part 60 that supplies a sample in a first sample container 21.

The robotic arm 10 includes an articulated arm member 10b to which a hand 15 is attached, and transports a second sample container 22 and a second sample container 23, which are held, grabbed or gripped by the hand 15, to the sample pretreatment sections 50. Then, different sample pretreatments are performed.

The sample pretreatment sections 50 execute multiple sample pretreatments, which are different from one another. The dispenser 51 dispenses a sample in the first sample container 21 into the second sample container 22 and the second sample container 23.

When a sample dispensed into the second sample container 22 is to be used in one measurement, the robotic arm 10 holds the second sample container 22 with the hand 15 and transports the second sample container 22 to the sample pretreatment section 50 in one group including the dispenser 51. Moreover, when a sample dispensed into the second sample container 23 is to be used in another measurement, the robotic arm 10 holds the second sample container 23 with the hand 15 and transports the second sample container 23 to the sample pretreatment section 50 in another group including the dispenser 51.

For example, when the first sample container 21 is supplied from the supplying part 60, the robotic arm 10 transports the first sample container 21 to the dispenser 51. In the dispenser 51, a first sample and a second sample are respectively dispensed into the second sample container 22 and the second sample container 23, from the first sample container 21.

Moreover, in accordance with respective measurement methods of the first measuring device 30 and the second measuring device 40, the first sample and the second sample are subjected to different pretreatments.

The first sample that is subjected to a pretreatment is supplied to the first measuring device 30. Moreover, the second sample that is subjected to a pretreatment different from that to the first sample is supplied to the second measuring device 40.

(Sample Measurement Process)

Figure 2:
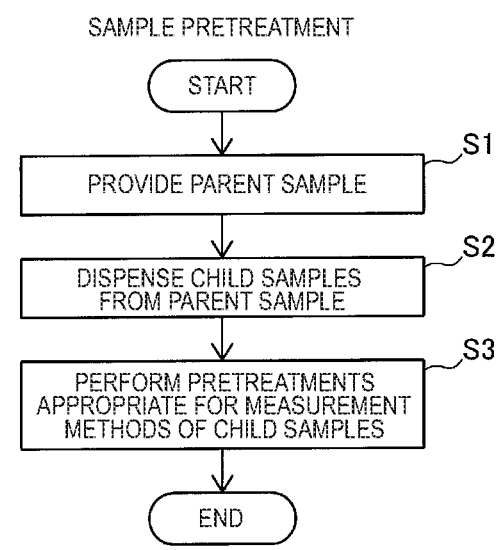
FIG. 2 is a flow diagram illustrating sample pretreatment.

With reference to FIG. 2, an overview of a sample measurement process is explained.

At step S1 in FIG. 2, a parent sample is provided. Specifically, the first sample container 21 in which a sample is accommodated or placed is provided to the supplying part 60. At step S2, child samples are dispensed from the parent sample. Specifically, the first sample container 21, the second sample container 22, and the second sample container 23 are transported to the dispenser 51. The samples are then dispensed from the first sample container 21 respectively to the second sample container 22 and the second sample container 23. At step S3, the child samples are subjected to respective pretreatments in accordance with the measurement methods thereof. Thereafter, the sample pretreatments are ended.

(Configuration of Sample Pretreatment Apparatus)

With reference to FIGS. 3 to 26, an example of a sample pretreatment apparatus 900 is explained according to a first embodiment. The sample pretreatment apparatus 900 executes a sample pretreatment for performing multiple measurements related to each other. Moreover, the sample pretreatment apparatus 900 performs a pretreatment of preparing, from a sample in the first sample container 21, a first sample that is used for a first measurement, and a second sample that is used for a second measurement relating to the first measurement. The sample pretreatment apparatus 900 is used, for example, a clinical test. The sample pretreatment apparatus 900 is provided in a hospital or an inspection institute.

The first measuring device 30 measures the first sample. The second measuring device 40 measures the second sample. The first measurement includes a measurement of the cell morphology in the first sample, and the second measurement includes a measurement of a biomarker in the second sample.

The first measuring device 30 is an exfoliated cell measuring device that measures exfoliated cells immobilized with a stock solution, by a flow cytometric method that uses laser. A prescribed amount of an exfoliated cell specimen measured by the exfoliated cell measuring device is aspirated out, undergoes a pretreatment process and a stain process, and is supplied in a flow cell by a sheath flow mechanism. The supplied exfoliated cell specimen is irradiated with laser light when passing through the flow cell, and scatter light and fluorescence are detected therefrom. The first measuring device 30 acquires, based on the detected scatter light and fluorescence, information on the size of cytoplasm, the size of nucleus, the amount of DNA in the cell, and the like, and determines whether and there is suspicion about cervical cancer.

The second measuring device 40 measures a human papilloma virus (HPV) included in the second sample. The second measuring device 40 extracts and measures a nucleic acid from the second sample.

Figure 3:
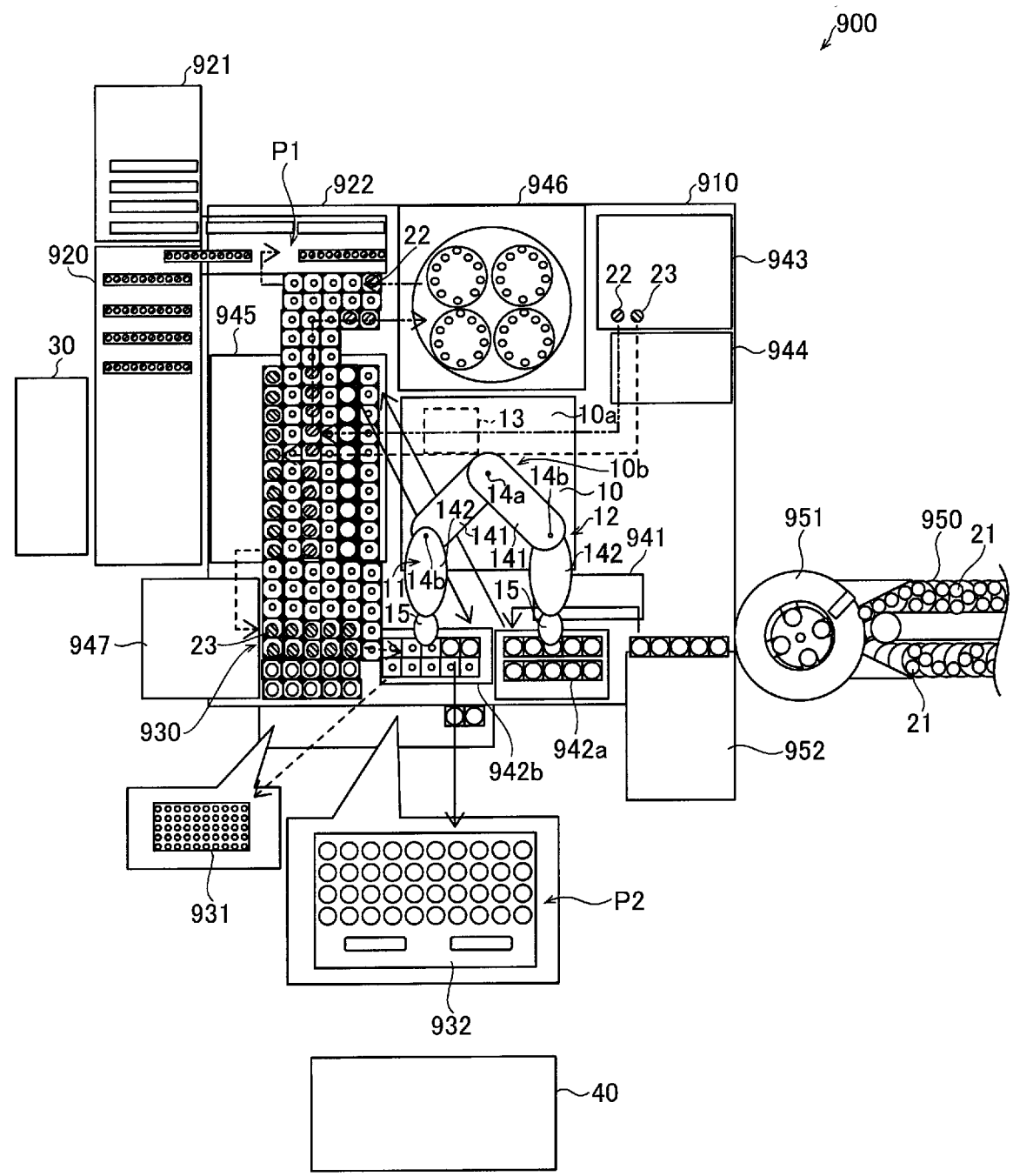
FIG. 3 is a diagram illustrating a configuration of a sample pretreatment apparatus according to a first embodiment.

The sample pretreatment apparatus 900 includes, as illustrated in FIG. 3, the robotic arm 10, a clean area 910, an exfoliated cell inputting part 920, a container placing part 930, an agitator 941, an opening part 942a, a closing part 942b, a centrifuge tube inputting part 943, an information attaching part 944, a dispenser 945, a centrifuge 946, a plug inputting part 947, an inputting part 950, and a reader 951. The exfoliated cell inputting part 920 includes a rack inputting part 921, and a transporter 922. The container placing part 930 includes an HPV inputting part 931, and a smear preparation inputting part 932. The inputting part 950 includes a rack unit 952.

The robotic arm 10 is provided on a base 10a. The robotic arm 10 is provided in plurality, and includes, for example, a first robotic arm 11, and a second robotic arm 12. Here, the robotic arm 10 transports the first sample container 21 in which a sample is accommodated. Moreover, the robotic arm 10 transports the second sample container 22 in which the first sample is accommodated. Moreover, the robotic arm 10 transports the second sample container 23 in which the second sample is accommodated. Note that, a single or multiple, that is three or more, robotic arms 10 may be provided. Here, in an embodiment, the robotic arm 10 transports the first sample container 21 in which a sample is accommodated. Moreover, the robotic arm 10 transports the second sample container 22 in which the first sample is accommodated. Moreover, the robotic arm 10 transports the second sample container 23 in which the second sample is accommodated. The robotic arm 10 may transport a rack in which a container is placed. The robotic arm 10 is capable of transporting a container or a rack in the horizontal direction and in the vertical direction.

The base 10a supports the robotic arm 10. Specifically, the base 10a supports the robotic arm 10 from the lower side. Moreover, the robotic arm 10 includes the articulated arm member 10b to which a hand 15 is attached.

The robotic arm 10 operates by being driven by a driving part including an electric motor, for example. The driving part drives the hand 15 and the articulated arm member 10b. The driving part transports the first sample container 21 held by the hand 15 to the dispenser 945. Moreover, the driving part transports the second sample container 22 and the second sample container 23 to sample pretreatment sections 50 so as to be subjected to different sample pretreatments, respectively. The dispenser 945 dispenses the first sample to be used in a first measurement from the first sample container 21 into the second sample container 22, and dispenses the second sample to be used in a second measurement relating to the first measurement from the first sample container 21 into the second sample container 23. The robotic arm 10 includes an encoder or the like, which controls the amount of driving by the electric motor. Moreover, the rated output of the robotic arm 10 is equal to or lower than a prescribed power.

Each of the first robotic arm 11 and the second robotic arm 12 includes a first link member 141 and a second link member 142. The first link member 141 and the second link member 142 constitute the articulated arm member 10b. The hand 15 is provided to each pair of the first robotic arm 11 and the second robotic arm 12. The hand 15 is attached to the articulated arm member 10b. The first link member 141 is turnable about a first axis line 14a. The second link member 142 is connected to the first link member 141 so as to be turnable about a second axis line 14b that is defined on the first link member 141 at a position different from that of the first axis line 14a. This enables the robotic arm 10 to turn about the multiple axis lines and operate, thereby obtaining a large workable range of the robotic arm 10. The first axis line 14a of the first robotic arm 11 and the first axis line 14a of the second robotic arm 12 are arranged by being overlapped with each other in plan view. Note that, the first axis line 14a of the first robotic arm 11 and the first axis line 14a of the second robotic arm 12 may be arranged by being separated from each other in plan view.

The first link members 141 and the second link members 142 are turned to enable the first robotic arm 11 and the second robotic arm 12 to respectively move the hands 15 in the horizontal direction. In other words, the first robotic arm 11 and the second robotic arm 12 are respectively capable of causing the hands 15 to move translationally in the horizontal direction and rotate in the horizontal direction, by the first link members 141 and the second link members 142. Moreover, the first robotic arm 11 and the second robotic arm 12 are respectively capable of moving the hands 15 in the vertical direction.

When the robotic arm 10 is brought into contact with an object other than an object to be transported during operation, the operation thereof is stopped. The robotic arm 10 may detect, for example, a drive current, and detect the contact with the object when the drive current exceeds a prescribed threshold. Moreover, a camera that monitors the operation of the robotic arm 10 may detect the contact between the robotic arm 10 and the object. Moreover, a sensor or the like may detect the contact between the robotic arm 10 and the object.

The base 10a is movable relative to an installation surface. This enables a layout to be changed in accordance with other devices, and a configuration to be changed in accordance with the type of a sample measurement. Moreover, the base 10a does not need to be arranged with a clearance with a different device and a wall for performing maintenance. This can suppress the installation area from increasing, and further increase the flexibility of installation of the other devices.

A controller 13 controls the operation of the robotic arm 10. In other words, the controller 13 controls operations of the first robotic arm 11 and the second robotic arm 12. The controller 13 includes, for example, a central process unit (CPU), a memory, and the like. Moreover, the controller 13 is connected to the robotic arm 10 in a wired or wireless manner. In other words, the controller 13 transmits a signal for controlling the robotic arm 10 to the robotic arm 10 via a wired communication or wireless communication. This enables the controller 13 to cause the first robotic arm 11 and the second robotic arm 12 to easily cooperate with each other and operate, and thus enables multiple robotic arms 10 to operate with high efficiency.

The controller 13 is housed in, for example, the base 10a. Note that, the controller 13 may be provided outside the base 10a. The controller 13 may acquire a relative position between a position of the base 10a and that of a different device by driving the robotic arm 10, and causing the robotic arm 10 to touch a jig provided to the different device. In other words, in a state where the jig is installed at a prescribed position of the different device, the robotic arm 10 moves to touch the jig, so that the controller 13 can detect the position at which the jig is arranged relative to the base 10a. This enables easy alignment between the robotic arm 10 and the different device. Note that, the alignment between the robotic arm 10 and the different device is performed when the robotic arm 10 and the different device are installed, when the robotic arm 10 is activated, or for every prescribed period.

The dispenser 945 dispenses a liquid. Specifically, the dispenser 945 dispenses a sample from the first sample container 21 into the second sample container 22 or the second sample container 23. Moreover, the dispenser 945 dispenses a reagent necessary for the pretreatment. Moreover, the dispenser 945 dispenses, from a sample in the first sample container 21, a first sample to be used in the first measurement into the second sample container 22, and a second sample to be used in the second measurement into the second sample container 23.

Moreover, the dispenser 945 dispenses a reagent necessary for the pretreatment. The dispenser 945 has an exchangeable dispensing pipette with which dispensing is performed. The dispenser 945 in a state of the dispensing pipette being attached thereto aspirates a liquid, and discharges the aspirated liquid. The dispenser 945 includes, for example, a pipette attaching part to which the dispensing pipette is detachably attached, and a driving part that performs an aspirating operation and a discharging operation of the dispensing pipette. The driving part includes a motor, an air cylinder, and the like.

The dispenser 945 discharges the first sample and the second sample so as to differ the discharge amount of the first sample and the discharge amount of the second sample from each other. Specifically, the dispenser 945 is configured to enable a first dispensing pipette for dispensing the first sample and a second dispensing pipette for dispensing the second sample to be attached thereto. Note that, the first dispensing pipette and the second dispensing pipette may be provided to the dispenser 945 so as to be alternatively exchangeable, or both may be provided and selectively used in the dispensing process. The first dispensing pipette and the second dispensing pipette are configured to have mutually different dispensing amounts. For example, the first dispensing pipette and the second dispensing pipette have different aspirating amounts.

The reader 951 reads identification information from the first sample container 21. For example, the reader 951 includes a bar code reader, a two-dimensional code reader, or an IC tag reader. Moreover, the reader 951 reads information attached to the first sample container 21. The identification information includes, for example, attribute information on a subject, collected date/time, a sample type, and the like.

The information attaching part 944 attaches, based on the identification information read by the reader 951, information at least either one of the second sample container 22 and the second sample container 23. The information attaching part 944 includes, for example, a printing part that prints identification information on a label, and a posting part that posts or attaches the label onto a container. Note that, the information attaching part 944 may directly print the information on the container. The information to be attached includes, for example, attribute information on a subject, collected date/time, a sample type, and the like.

The centrifuge tube inputting part 943 supplies an empty container (centrifuge tube). Specifically, the centrifuge tube inputting part 943 supplies the empty second sample container 22 and the empty second sample container 23. In the centrifuge tube inputting part 943, the second sample container 22 and the second sample container 23 are placed on a conveyor, and the conveyor transports the second sample container 22 and the second sample container 23. Note that, containers of the same type may be used as the second sample container 22 and the second sample container 23. In this case, the centrifuge tube inputting part 943 supplies a container at the common position. Moreover, containers of mutually different types may be used as the second sample container 22 and the second sample container 23. In this case, the centrifuge tube inputting part 943 supplies the second sample container 22 and the second sample container 23 by being distinguished.

The plug inputting part 947 supplies a plug to the opening part 942a. The robotic arm 10 transports the plug supplied from the plug inputting part 947 to the opening part 942a. A general-purpose product can be used as the plug inputting part 947.

Here, in a first embodiment, the robotic arm 10 transports the second sample container 22 in which the first sample is accommodated and the second sample container 23 in which the second sample is accommodated so as to be subjected to different pretreatments. As for the first sample to be used in the measurement of the cell morphology, the robotic arm 10 transports the second sample container 22 to a sample pretreatment section in a group including the dispenser 945 and the centrifuge 946. Note that, this group includes the information attaching part 944. Moreover, as for the second sample to be used in the measurement of a biomarker, the robotic arm 10 transports the second sample container 23 to a sample pretreatment section in a group including the dispenser 945 and the closing part 942b. Note that, this group includes the information attaching part 944.

In the example illustrated in FIG. 3, the first sample container 21 is inputted from the inputting part 950. The reader 951 reads identification information from the inputted first sample container 21. The first sample container 21 is transported to the rack unit 952 based on the identification information. The robotic arm 10 then transports the first sample container 21 to the agitator 941. After the agitator 941 agitates, shakes, or stirs the sample in the first sample container 21, the robotic arm 10 transports the first sample container 21 to the opening part 942a. After the opening part 942a opens a lid of the first sample container 21, the robotic arm 10 transports the first sample container 21 to the dispenser 945. A general-purpose product can be used as the inputting part 950. For example, IDS-CLASX-1 series manufactured by IDS Co., Ltd. may be used as the inputting part 950. Moreover, a general-purpose product can be used as the reader 951.

Moreover, the robotic arm 10 takes out the empty second sample container 22 from the centrifuge tube inputting part 943, and transports the empty second sample container 22 to the information attaching part 944. After the information attaching part 944 attaches information to the second sample container 22, the robotic arm 10 transports the second sample container 22 transports to the dispenser 945. When the dispenser 945 dispenses the sample into the second sample container 22, the robotic arm 10 transports the second sample container 22 to the centrifuge 946. After the centrifuge 946 centrifuges the first sample, the robotic arm 10 transports the second sample container 22 to a first sample inputting part 31.

Moreover, the robotic arm 10 transports the second sample container 22 and the second sample container 23 to the information attaching part 944 in order to attach identification information to the second sample container 22 and the second sample container 23, and transports the second sample container 22 and the second sample container 23 to the dispenser 945 in order to dispense a sample into the second sample container 22 and the second sample container 23.

Moreover, the robotic arm 10 takes out the empty second sample container 23 from the centrifuge tube inputting part 943, and transports the empty second sample container 23 to the information attaching part 944. After the information attaching part 944 attaches information to the second sample container 23, the robotic arm 10 the second sample container 23 transports to the dispenser 945. When the dispenser 945 dispenses the sample to the second sample container 23, the robotic arm 10 transports the second sample container 23 to a second child sample inputting part 41.

Moreover, the robotic arm 10 transports the second sample container 22 to the centrifuge 946 serving as a sample pretreatment section, moves the second sample container 22 to which a centrifugation process serving as a sample pretreatment is executed to a first position P1, and does not transport the second sample container 23 to the centrifuge 946 but moves the second sample container 23 to a second position P2 that is different from the first position P1. In other words, the first sample may be subjected to the centrifugation process performed by the centrifuge 946. Meanwhile, the second sample may not be subjected to the centrifugation process.

The first sample container 21, the second sample container 22, and the second sample container 23 may be transported so as to be subjected to other pretreatments. Moreover, the sample pretreatment apparatus 100 may be provided with another processor.

Figure 4:
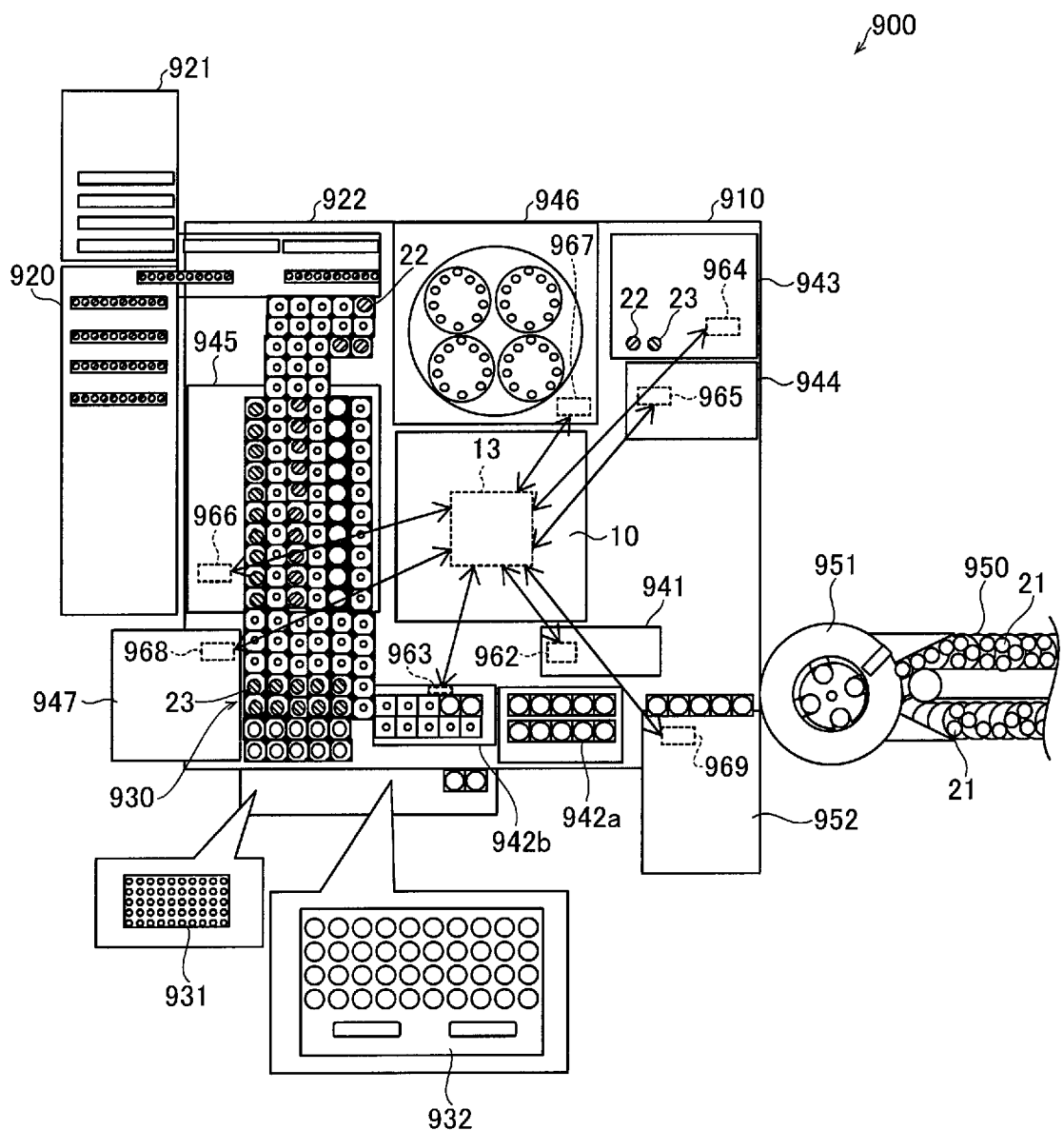
FIG. 4 is a diagram illustrating a communication process of a sample pretreatment apparatus.

Moreover, as illustrated in FIG. 4, the parts in the sample pretreatment apparatus 900 respectively include controllers. Specifically, the robotic arm 10 includes the controller 13. Moreover, the agitator 941 includes a controller 962. Moreover, the closing part 942b includes a controller 963. Moreover, the centrifuge tube inputting part 943 includes a controller 964. Moreover, the information attaching part 944 includes a controller 965. Moreover, the dispenser 945 includes a controller 966. Moreover, the centrifuge 946 includes a controller 967. Moreover, the plug inputting part 947 includes a controller 968. Moreover, the rack unit 952 includes a controller 969. Each of the controllers includes a central processing unit (CPU) and a storage unit such as a memory.

The controller 13 of the robotic arm 10 can communicate with the controllers 962 to 969. The controller 13 communicates with the other units to transport the sample container and control for the pretreatments.

As illustrated in FIG. 5, the controller 13 communicates with the controllers 962 to 969 to create a table of position information. In the example illustrated in FIG. 5, the controller 13 acquires positions of samples set as numbers 1, 2, 3 . . . . In the example illustrated in FIG. 5, the controller 13 communicates with the controller 969 to acquire read information on a bar code of a parent sample. Moreover, the controller 13 communicates with the controller 962 to acquire information on a start and an end of the agitation. Moreover, the controller 13 communicates with the controller 963 to acquire information on an opening of the first sample container 21. Moreover, the controller 13 communicates with the controller 966 to acquire a dispensing position of the parent sample. For example, when there are three dispensing positions, the controller 13 acquires the positions by being distinguished from one another. In the example of FIG. 5, the controller 13 acquires the dispensing positions by being distinguished as "(X1, Y1, Z1)", "(X2, Y2, Z2)", and "(X3, Y3, Z3)". Note that, coordinate position of a dispensing position is set with respect to a reference position of the robotic arm 10. The reference position may be set, for example, based on a rotation axis of the robotic arm 10.

Moreover, the controller 13 communicates with the controller 963 to acquire an input position for smear preparing of the parent sample. For example, when there are three input positions, the controller 13 acquires the positions by being distinguished from one another. In the example of FIG. 5, the controller 13 acquires the input positions by being distinguished as "(Xa, Ya, Za)", "(Xb, Yb, Zb)", and "(Xc, Yc, Zc)". Note that, the coordinate position of the input position is set with respect to a reference position of the robotic arm 10. Moreover, the controller 13 communicates with the controller 964 to acquire inputting information on the second sample container 22 and the second sample container 23. Moreover, the controller 13 communicates with the controller 965 to transmit read information on a bar code to be attached to a child sample.

Moreover, the controller 13 communicates with the controller 966 to acquire a dispensing position of the first sample. Moreover, the controller 13 communicates with the controller 966 to acquire a dispensing position of the second sample. For example, when there are three dispensing positions, the controller 13 acquires the positions by being distinguished from one another. In the example of FIG. 5, the controller 13 acquires the dispensing positions by being distinguished as "(X4, Y4, Z4)", "(X5, Y5, Z5)", "(X6, Y6, Z6)", "(X7, Y7, Z7)", "(X8, Y8, Z8)", and "(X9, Y9, Z9)". Note that, the coordinate position of a dispensing position is set with respect to a reference position of the robotic arm 10. Moreover, the controller 13 communicates with the controller 967 to acquire information on a start and an end of the centrifugation of the first sample.

Moreover, the controller 13 communicates with the controller 963 to acquire information on a start and an end of the closing of the second sample container 23. Moreover, the controller 13 acquires information on inputting of a sample of HPV into a measuring device. Moreover, the controller 13 acquires information on inputting of a sample of exfoliated cells into the measuring device.

(Hand)

With reference to FIGS. 6 to 10, the hand 15 that is provided to the robotic arm 10 is explained.

Figure 6:
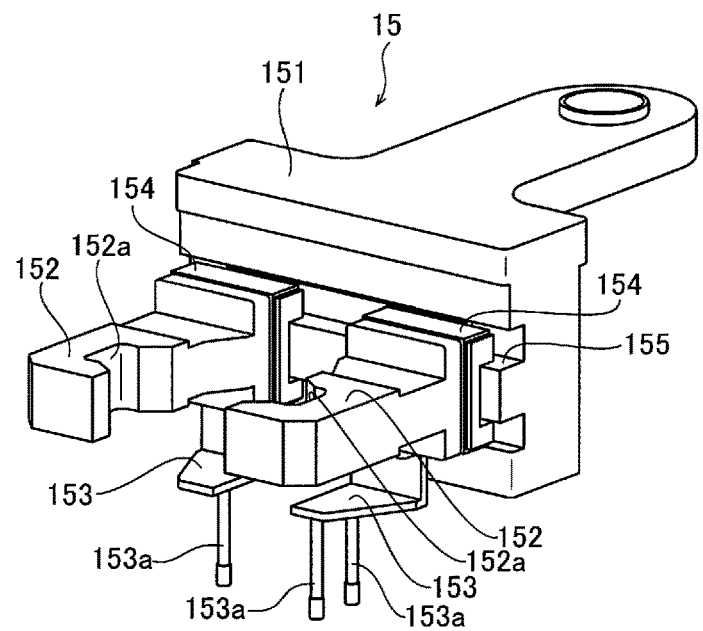
FIG. 6 is a perspective diagram illustrating a hand provided to a robotic arm.

The hand 15 can hold the first sample container 21, the second sample container 22, the second sample container 23, and a dispensing pipette 16. Moreover, the hand 15 is attached to the robotic arm 10 in an exchangeable manner. As illustrated in FIG. 6, the hand 15 includes a supporting part 151, a pair of pipette holding parts 152, a pair of container holding parts 153, sliders 154, and a rail 155. Recess parts 152a are respectively formed in the pair of pipette holding parts 152. Three abutting parts 153a in total are provided to the pair of container holding parts 153.

The supporting part 151 is configured to be attached to the robotic arm 10. Moreover, the supporting part 151 supports the pair of pipette holding parts 152, the pair of container holding parts 153, the sliders 154, and the rail 155. The pair of pipette holding parts 152 is configured to hold the dispensing pipette 16. Specifically, the pair of pipette holding parts 152 can move in a direction to approach each other and in a direction to move away from each other, by the driving part. This enables the pipette holding parts 152 to hold or release the dispensing pipette 16. Note that, the driving part includes, for example, an air cylinder or a motor. The recess parts 152a are formed to be recessed in a shape along a shape of a held part 161 of the dispensing pipette 16. This enables the pipette holding parts 152 to reliably hold the dispensing pipette 16.

The pair of container holding parts 153 is configured to hold a container. Specifically, the pair of container holding parts 153 is configured to hold the first sample container 21, the second sample container 22, or the second sample container 23. The pair of container holding parts 153 can move in a direction to approach each other and in a direction to move away from each other, by the driving part. This enables the container holding parts 153 to hold or release a container. Note that, the pair of container holding parts 153 moves in a direction to approach each other and in a direction to move away from each other, in conjunction with the pair of pipette holding parts 152. This enables the pair of container holding parts 153 and the pair of pipette holding parts 152 to use the common driving part, so that it is possible to simplify the hand 15 and to decrease the number of components. The abutting parts 153a are provided in such a manner that one is provided to one of the container holding parts 153, and two are provided to the other container holding part 153. Moreover, the abutting parts 153a are configured to abut on a container, thereby holding the container. Each of the abutting parts 153a includes a bar shape that extends in the vertical direction. In other words, the abutting parts 153a are formed so as to extend in the axis direction of the cylindrical container.

A pair of the sliders 154 is provided. Moreover, the sliders 154 are configured to be movable along the rail 155. One of the pair of pipette holding parts 152 and one of the pair of container holding parts 153 are connected to one of the pair of the sliders 154. Moreover, the other the pair of pipette holding parts 152 and the other of the pair of container holding parts 153 are connected to the other of the pair of the slider 154. This moves the pair of sliders 154 along the rail 155, so that a mutual distance between the pair of pipette holding parts 152 and a mutual distance between the pair of container holding parts 153 can be changed.

Figure 7:
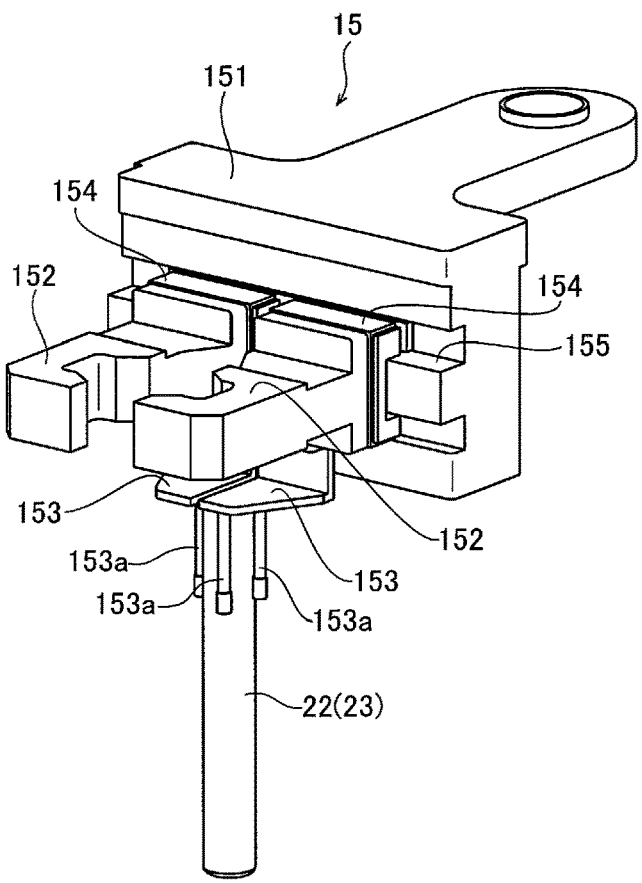
FIG. 7 is a diagram illustrating holding of a second sample container with a hand.

As illustrated in FIG. 7, when the second sample container 22 or the second sample container 23 is held by the hand 15, the three abutting parts 153a of the container holding parts 153 sandwich and hold the second sample container 22 or the second sample container 23.

Figure 8:
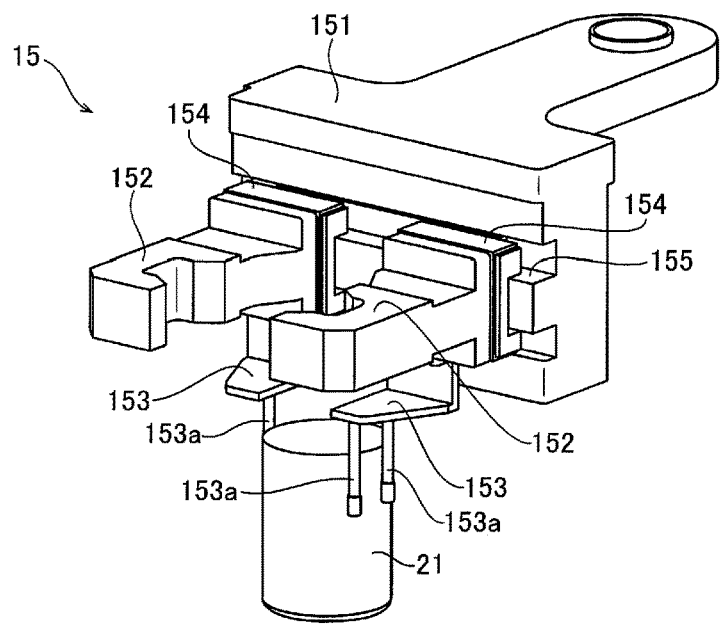
FIG. 8 is a diagram illustrating holding of a first sample container with a hand.

As illustrated in FIG. 8, when the first sample container 21 is held by the hand 15, the three abutting parts 153a of the container holding parts 153 sandwich and hold the first sample container 21. The hand 15 is capable of holding each of containers having different diameters with the pair of container holding parts 153.

In other words, the first sample container 21 has a shape different from that of the second sample container 22 and the second sample container 23. Moreover, the hand 15 is configured to be capable of holding each of the first sample container 21, the second sample container 22 and the second sample container 23.

Figure 9:
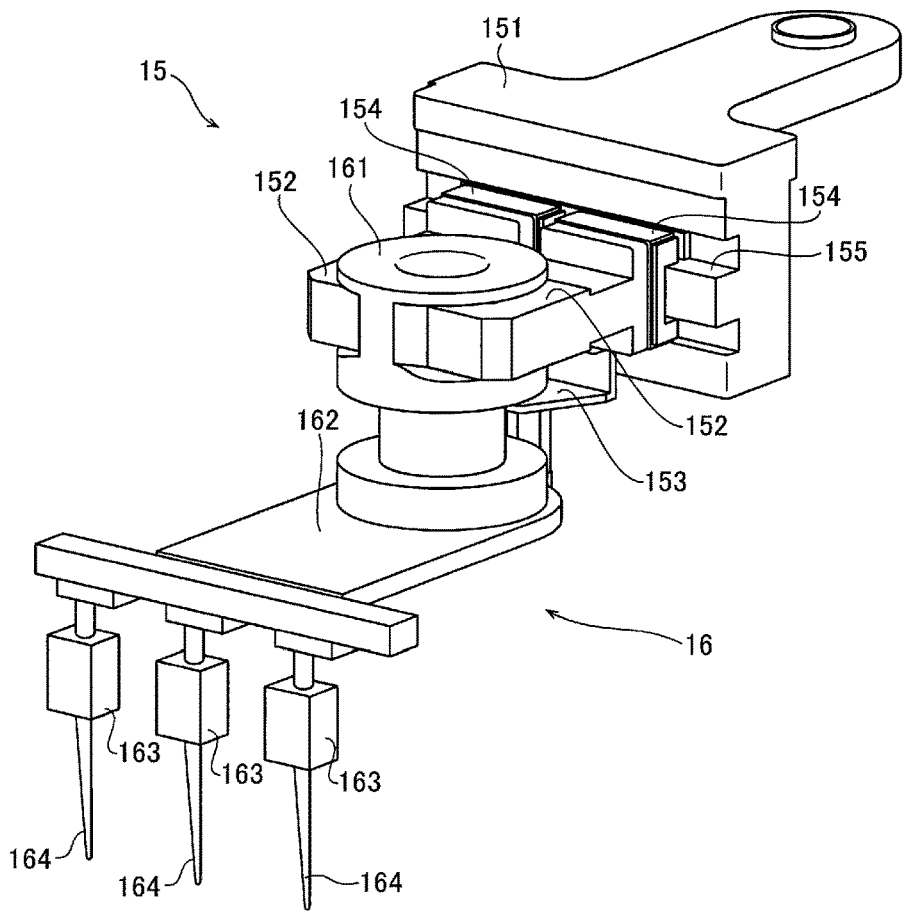
FIG. 9 is a diagram illustrating holding of dispensing pipettes with a hand.

As illustrated in FIG. 9, when the hand 15 holds the dispensing pipette 16, the pipette holding parts 152 sandwich and hold the dispensing pipette 16. In the example illustrated in FIG. 9, the dispensing pipette 16 includes the held part 161, a supporting part 162, multiple aspirators 163. A chip 164 is provided on a tip of each aspirator 163. The held part 161 has a cylindrical shape that extends in the vertical direction. The held part 161 is fitted into the recess parts 152a of the pipette holding parts 152, and is held by the pipette holding parts 152. The supporting part 162 connects the held part 161 to the multiple aspirators 163. The multiple aspirators 163 are configured to aspirate liquids, and discharge the aspirated liquids. Moreover, the aspirators 163 are configured to be exchangeable. Moreover, the robotic arm 10 may perform an attaching operation and a detaching operation of the dispensing pipette 16 with respect to the dispenser 945, by using the hand 15.

Figure 10:
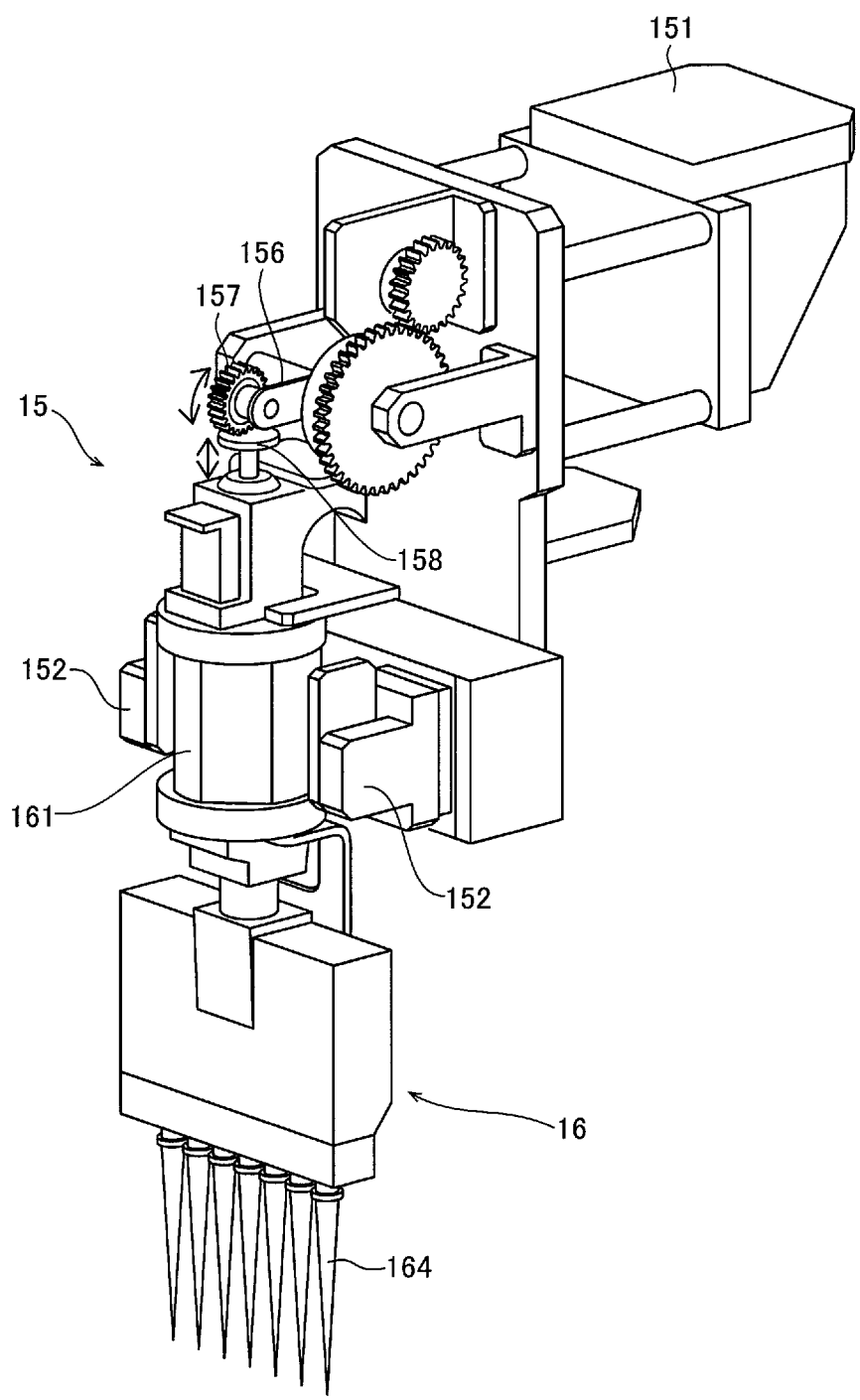
FIG. 10 is a diagram illustrating dispensing by dispensing pipettes held by a hand.

As illustrated in FIG. 10, in a state where the dispensing pipette 16 is held by the hand 15, dispensing may be performed. In this case, the hand 15 further includes an arm 156, a gear wheel 157 that is provided on a tip of the arm 156, and a plunger 158 that abuts on the gear wheel 157. A lower end portion of the plunger 158 is connected to the dispensing pipette 16. The dispensing pipette 16 is pressed in the downward direction by the plunger 158, thereby discharging the liquid. Moreover, when the press by the plunger 158 is canceled, the dispensing pipette 16 is urged in the upward direction by an urging member such as a spring, thereby aspirating the liquid. When the driving mechanism causes the arm 156 to turn in the downward direction, the plunger 158 is pressed by the gear wheel 157 at the tip, and moves in the downward direction.

As illustrated in FIG. 11, the first sample container 21, the second sample container 22, and the second sample container 23 are transported. Specifically, a sample is contained in the first sample container 21, which serves as a uterine cervical sample preservation solution. Moreover, the second sample container 22 is used as an exfoliated cell measurement centrifuge tube. Moreover, the second sample container 23 is used as an HPV measurement centrifuge tube. In order to test cervical cancer, the exfoliated cell measurement and the HPV measurement are performed, so that the test can be performed with higher accuracy.

The first sample container 21 is inputted from the inputting part 950. The inputting part 950 has a conveyor, and transports the multiple first sample containers 21. The reader 951 reads a bar code that is adhered on an outer circumferential portion of the first sample container 21. Whether the first sample container 21 is a measurement object is determined based on information on the bar code. The first sample container 21 that is a measurement object is sent to the rack unit 952. In contrast, the first sample container 21 that is not a measurement object is continuously transported by the inputting part 950, and is sent to the downstream.

When a parent sample is inputted, communication is performed between the controller 969 of the rack unit 952 and the controller 13 of the robotic arm 10. The first sample container 21 that is a measurement object is transported to the agitator 941 by the first robotic arm 11, and is subjected to an agitating process. In this case, communication is performed between the controller 962 of the agitator 941 and the controller 13 of the robotic arm 10. The first sample container 21 after the agitating process is then transported to the opening part 942a by the first robotic arm 11, and is subjected to an opening process. In this case, communication is performed between the controller 963 and the controller 13 of the robotic arm 10. The first sample container 21 after the opening process is transported to the dispenser 945 by the first robotic arm 11, and is subjected to a dispensing process. In this case, communication is performed between the controller 966 and the controller 13 of the robotic arm 10. Thereafter, the first sample container 21 is moved to the closing part 942b, and is subjected to a closing process. In this case, communication is performed between the controller 963 and the controller 13 of the robotic arm 10. After the closing process, the first sample container 21 is then transported to the smear preparation inputting part 932.

The second sample container 22 is supplied from the centrifuge tube inputting part 943, and is transported by the second robotic arm 12. In this case, communication is performed between the controller 964 and the controller 13 of the robotic arm 10. The second sample container 22 is transported to the information attaching part 944, and is attached with information based on the bar code information of the first sample container 21. In this case, communication is performed between the controller 965 and the controller 13 of the robotic arm 10. Thereafter, the second sample container 22 is transported to the dispenser 945 by the second robotic arm 12, and is subjected to a dispensing process after waiting. Specifically, a prescribed amount of samples are transferred from the first sample container 21.

Thereafter, the second sample container 22 is moved to a transport position, is transported to the centrifuge 946 by the second robotic arm 12, and is subjected to a centrifugation process. In this case, communication is performed between the controller 967 and the controller 13 of the robotic arm 10. The second sample container 22 after the centrifugation process is transported to the dispenser 945 by the second robotic arm 12, and is subjected to a supernatant removing process. In this case, communication is performed between the controller 966 and the controller 13 of the robotic arm 10. Thereafter, the second sample container 22 is moved to the exfoliated cell inputting part 920.

The second sample container 23 is supplied from the centrifuge tube inputting part 943, and is transported by the second robotic arm 12. In this case, communication is performed between the controller 964 and the controller 13 of the robotic arm 10. The second sample container 23 is transported to the information attaching part 944, and is attached with information based on the bar code information of the first sample container 21. In this case, communication is performed between the controller 965 and the controller 13 of the robotic arm 10. Thereafter, the second sample container 23 is transported to the dispenser 945 by the second robotic arm 12, and is subjected to a dispensing process. Specifically, a prescribed amount of samples are transferred from the first sample container 21.

Thereafter, the second sample container 23 is moved to a transport position, and is supplied with a plug from a plug inputting part. In this case, communication is performed between the controller 968 and the controller 13 of the robotic arm 10. The second sample container 23 is then transported to the closing part 942b by the second robotic arm 12, and is subjected to a closing process. In this case, communication is performed between the controller 963 and the controller 13 of the robotic arm 10. Thereafter, the second sample container 23 is moved to the HPV inputting part 931.

Next, with reference to FIGS. 12 to 20, a pretreatment operation is explained. Note that, the controller 13 performs control of the pretreatment operation while communicating with the controllers 962 to 969.

Figure 12:
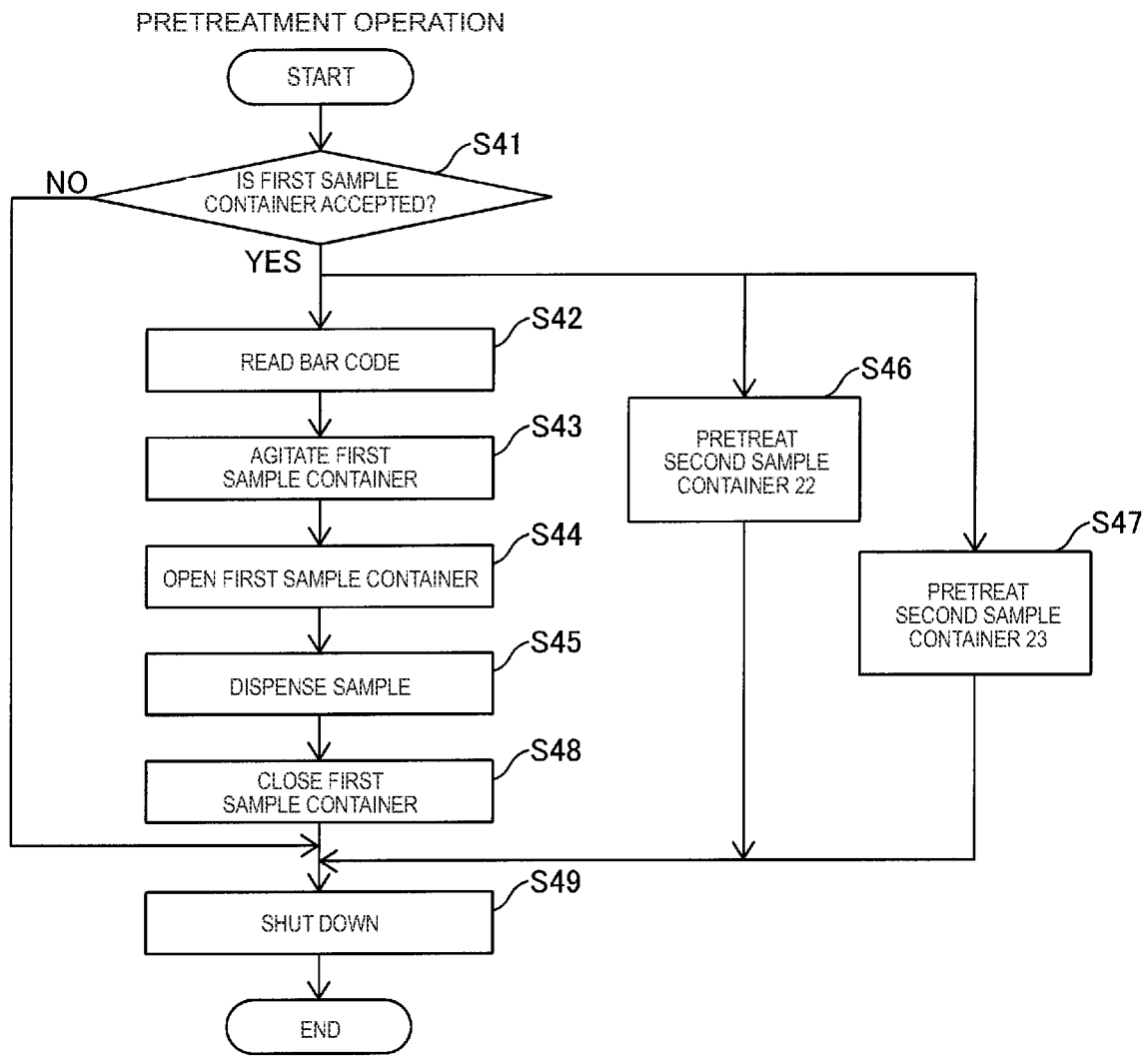
FIG. 12 is a flow diagram illustrating a pretreatment operation.
Figure 13:
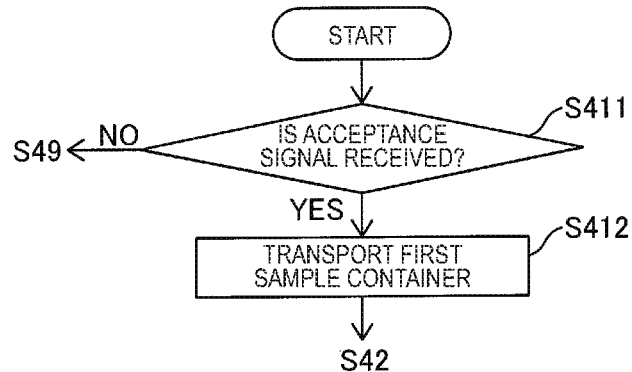
FIG. 13 is a flow diagram illustrating a first sample container accepting process, such as at step S41 in FIG. 12.
Figure 14:
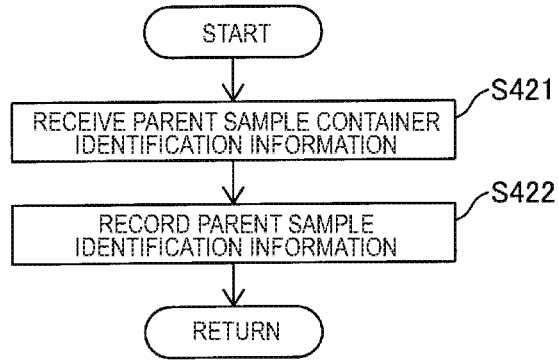
FIG. 14 is a flow diagram illustrating a bar code reading process, such as at step S42 in FIG. 12.
Figure 15:
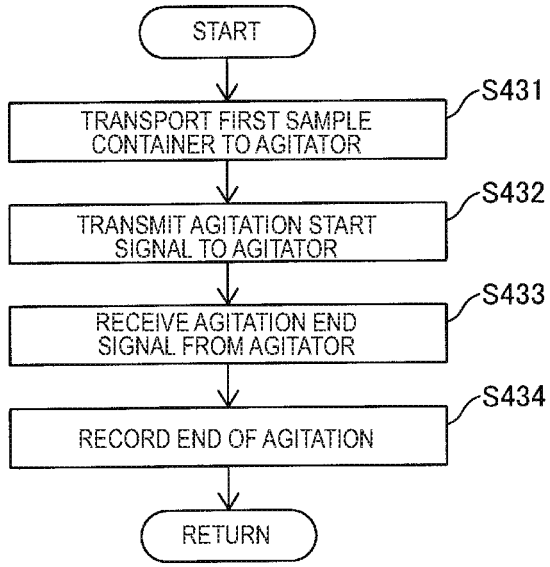
FIG. 15 is a flow diagram illustrating a sample agitating process, such as at step S43 in FIG. 12.
Figure 16:
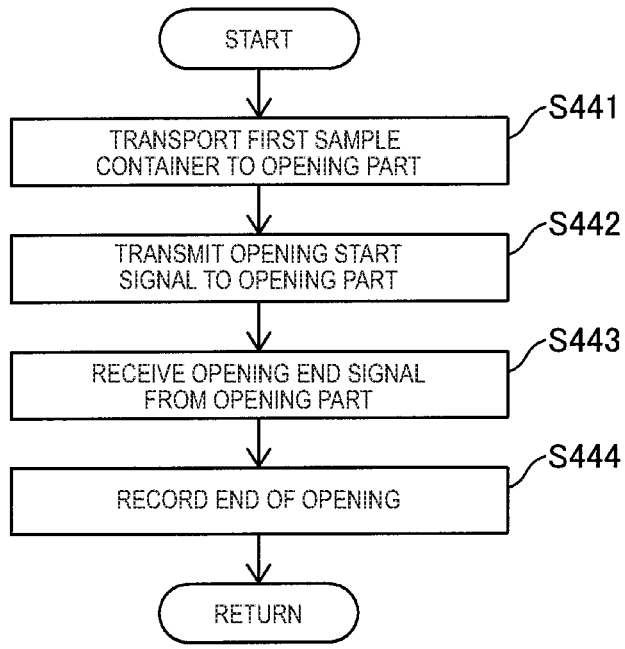
FIG. 16 is a flow diagram illustrating a first sample container opening process, such as at step S44 in FIG. 12.
Figure 17:
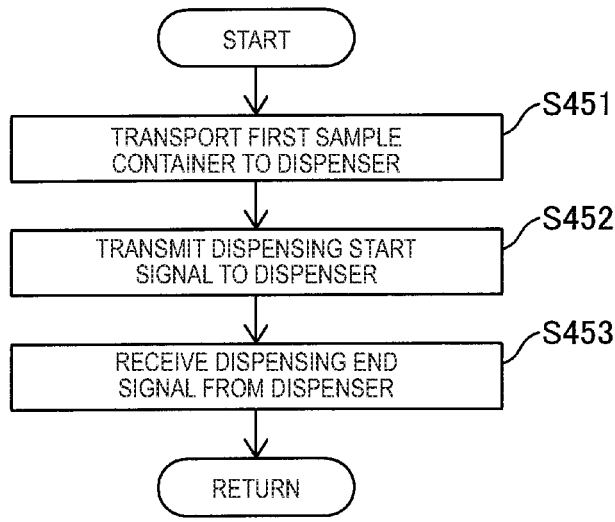
FIG. 17 is a flow diagram illustrating a sample dispensing process, such as at step S45 in FIG. 12.
Figure 18:
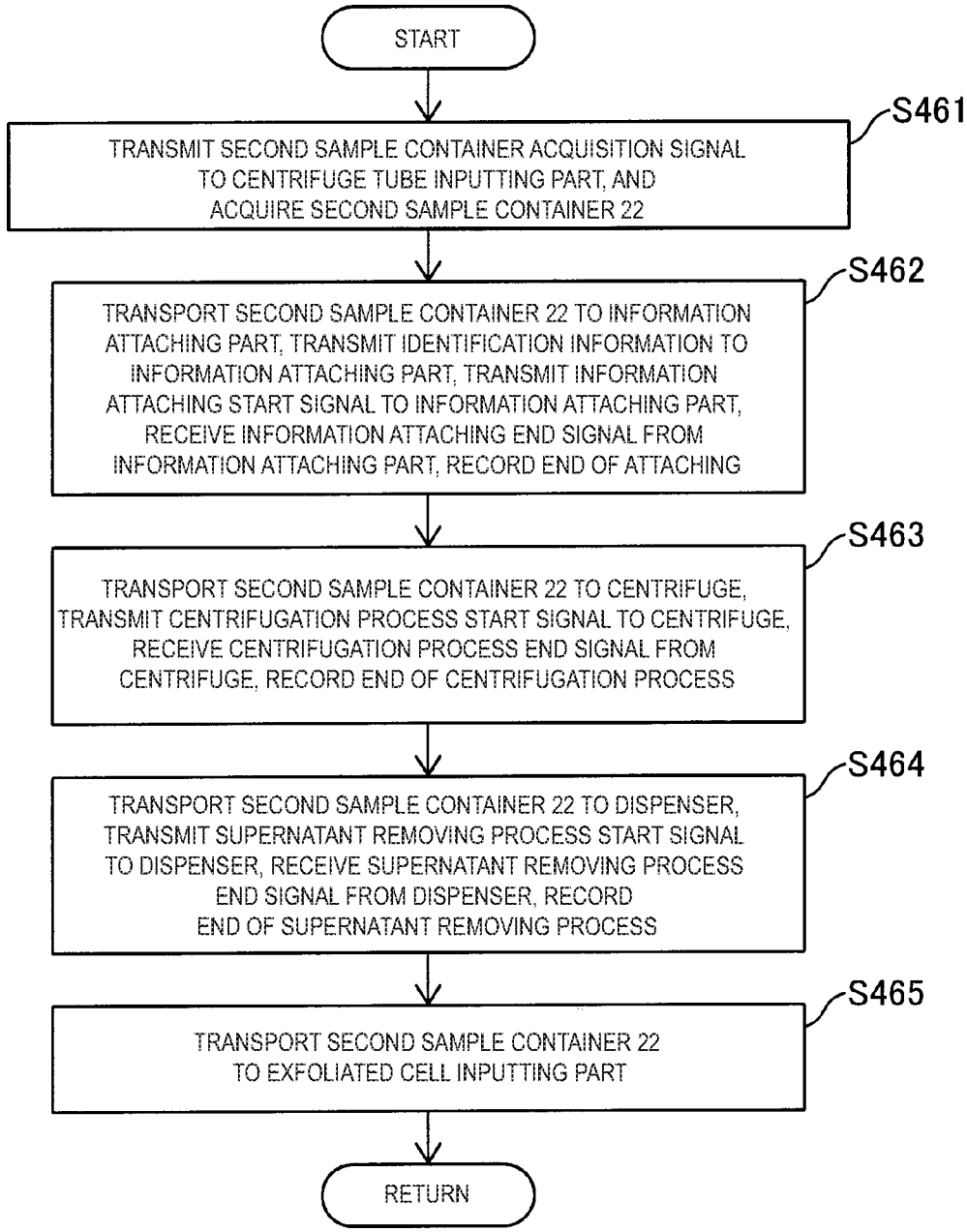
FIG. 18 is a flow diagram illustrating a pretreatment operation on a second sample container, such as at step S46 in FIG. 12.
Figure 19:
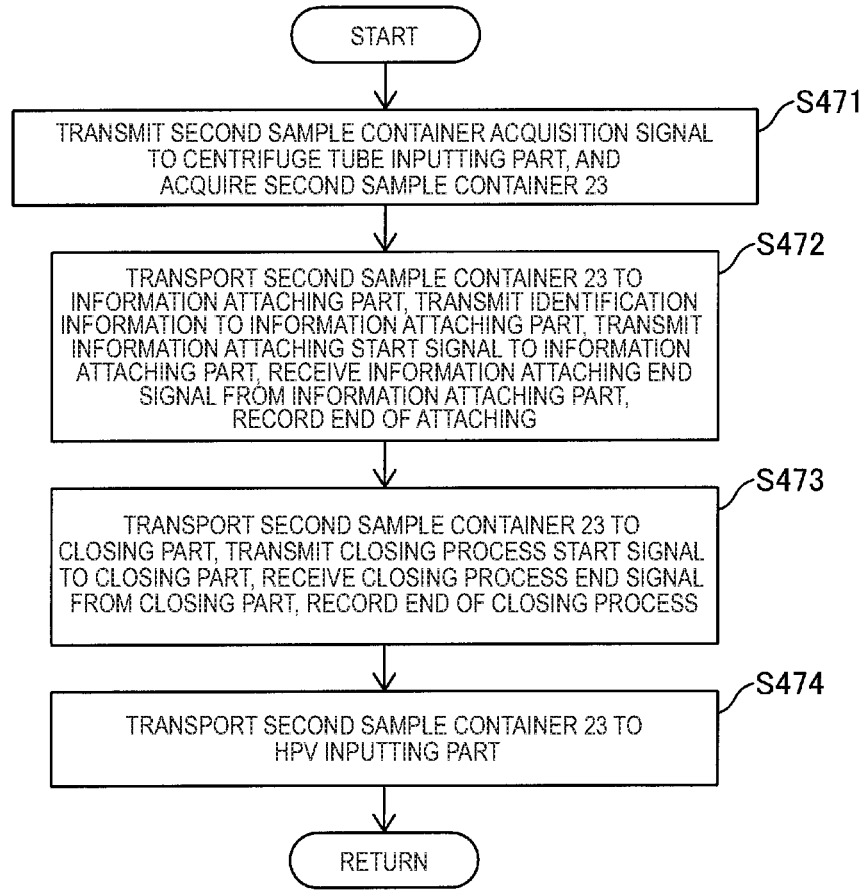
FIG. 19 is a flowchart illustrating a pretreatment operation on a second sample container, such as at step S47 in FIG. 12.
Figure 20:
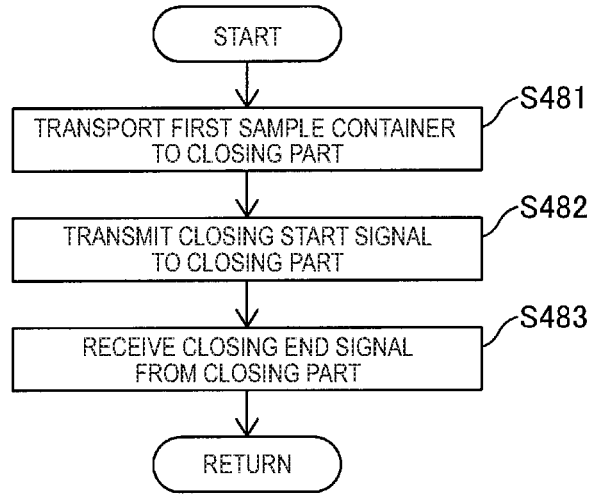
FIG. 20 is a flow diagram illustrating a first sample container closing process, such as at step S48 in FIG. 12.

At step S41 in FIG. 12, whether the first sample container 21 is accepted is determined. In other words, whether the first sample container 21 is supplied by the inputting part 950 and is transported to the rack unit 952 is determined. For example, communication is performed between the controller 969 of the rack unit 952 and the controller 13 of the robotic arm 10, and the acceptance of the first sample container 21 to the rack unit 952 is transmitted to the controller 13. If the first sample container 21 is accepted, the operation proceeds to step S42, whereas if the first sample container 21 is not accepted, the operation proceeds to step S49. Specifically, at step S411 in FIG. 13, whether the controller 13 receives an acceptance signal from the controller 969 of the rack unit 952 is determined. It the controller 13 receives an acceptance signal, the process proceeds to step S412, whereas if the controller 13 does not receive, the process proceeds to step S49 (see FIG. 12). At step S412, the first sample container 21 is taken out from the rack unit 952, and is transported. Note that, a transport operation by the robotic arm 10 is performed based on coordinate positions, which are allocated to the respective sample pretreatment sections and the respective dispensing positions.

At step S42 in FIG. 12, the reader 951 reads a bar code of the first sample container 21. For example, as illustrated in FIG. 5, information on bar code reading (For example, A, B, C . . . ) is transmitted to the controller 13. Specifically, at step S421 in FIG. 14, the controller 13 receives identification information on the first sample container 21 from the reader 951. At step S422, parent sample identification information is recorded.

At step S43 in FIG. 12, the agitator 941 performs an agitating process for the first sample container 21. For example, communication is performed between the controller 962 of the agitator 941 and the controller 13 of the robotic arm 10, and the agitator 941 starts the agitating process. Moreover, after the agitation is ended, a completion signal is transmitted to the controller 13. Moreover, as illustrated in FIG. 5, an end of the agitating process is recorded. Specifically, at step S431 in FIG. 15, the first sample container 21 is transported to the agitator 941. At step S432, the controller 13 transmits an agitation start signal to the controller 962 of the agitator 941. When the agitation is ended, at step S433, the controller 13 receives an agitation end signal from the controller 962 of the agitator 941. At step S434, the controller 13 records an end of the agitation.

At step S44 in FIG. 12, the opening part 942a performs an opening process for the first sample container 21. For example, communication is performed between the controller 963 and the controller 13 of the robotic arm 10, and the opening part 942a starts the opening process. Moreover, after the opening is ended, a completion signal is transmitted to the controller 13. Moreover, as illustrated in FIG. 5, an end of opening is recorded. Specifically, at step S441 in FIG. 16, the robotic arm 10 transports the first sample container 21 to the opening part 942*a*. At step S442, the controller 13 transmits an opening start signal to the controller 963 of the opening part 942*a*. After the opening is ended, at step S443, the controller 13 receives an opening end signal from the controller 963 of the opening part 942*a*. At step S444, the controller 13 then records an end of the opening.

At step S45 in FIG. 12, the dispenser 945 performs a dispensing process for the first sample container 21. For example, communication is performed between the controller 966 and the controller 13 of the robotic arm 10, and the controller 13 starts the dispensing process. Moreover, as illustrated in FIG. 5, a dispensing position is transmitted to the controller 13, and is recorded. Moreover, after the dispensing process is ended, a completion signal is transmitted to the controller 13. Specifically, at step S451 in FIG. 17, the first sample container 21 is transported to the dispenser 945. At step S452, the controller 13 transmits a dispensing start signal to the controller 966 of the dispenser 945. When the dispensing is ended, at step S453, the controller 13 receives a dispensing end signal from the controller 966 of the dispenser 945.

At step S46 in FIG. 12, a pretreatment operation for the second sample container 22 is performed. Specifically, at step S461 in FIG. 18, the controller 13 transmits an acquisition signal of the second sample container 22 to the controller 964 of the centrifuge tube inputting part 943. The second sample container 22 is then supplied from the centrifuge tube inputting part 943, and the robotic arm 10 acquires the second sample container 22.

At step S462, the robotic arm 10 transports the second sample container 22 to the information attaching part 944. Moreover, the controller 13 transmits the identification information acquired from the first sample container 21 to the controller 965 of the information attaching part 944. Moreover, the controller 13 transmits an information attaching start signal to the controller 965. When the information attaching to the second sample container 22 is ended, the controller 13 receives an information attaching end signal from the controller 965 of the information attaching part 944. The controller 13 then records an end of the attaching.

At step S463, the robotic arm 10 transports the second sample container 22 to the centrifuge 946. Moreover, the controller 13 transmits a centrifugation process start signal to the controller 967 of the centrifuge 946. When the centrifugation process for the second sample container 22 is ended, the controller 13 receives a centrifugation process end signal from the controller 967 of the centrifuge 946. The controller 13 then records an end of the centrifugation process.

At step S464, the robotic arm 10 transports the second sample container 22 to the dispenser 945. Moreover, the controller 13 transmits a supernatant removing process start signal to the controller 966 of the dispenser 945. When the supernatant removing process for the second sample container 22 is ended, the controller 13 receives a supernatant removing process end signal from the controller 966 of the dispenser 945. The controller 13 then records an end of the supernatant removing process.

At step S465, the robotic arm 10 transports the second sample container 22 to the exfoliated cell inputting part 920.

At step S47 in FIG. 12, a pretreatment operation for the second sample container 23 is performed. Specifically, at step S471 in FIG. 19, the controller 13 transmits an acquisition signal of the second sample container 23 to the controller 964 of the centrifuge tube inputting part 943. The second sample container 23 is then supplied from the centrifuge tube inputting part 943, and the robotic arm 10 acquires the second sample container 23.

At step S472, the robotic arm 10 transports the second sample container 23 to the information attaching part 944. Moreover, the controller 13 transmits the identification information acquired from the first sample container 21 to the controller 965 of the information attaching part 944. Moreover, the controller 13 transmits an information attaching start signal to the controller 965. When the information attaching to the second sample container 23 is ended, the controller 13 receives an information attaching end signal from the controller 965 of the information attaching part 944. The controller 13 then records an end of the attaching.

At step S473, the robotic arm 10 transports the second sample container 23 to the closing part 942*b*. Moreover, the controller 13 transmits a closing start signal to the controller 963 of the closing part 942*b*. When the closing process for the second sample container 23 is ended, the controller 13 receives a closing process end signal from the controller 963 of the closing part 942*b*. The controller 13 then records an end of the closing process.

At step S474, the robotic arm 10 transports the second sample container 23 to the HPV inputting part 931.

At step S48 in FIG. 12, the closing part 942*b* performs a closing process for the first sample container 21. For example, communication is performed between the controller 963 and the controller 13 of the robotic arm 10, and the closing part 942*b* starts the closing process. Moreover, after the closing is ended, a completion signal is transmitted to the controller 13. Moreover, as illustrated in FIG. 5, an end of the closing is recorded. Specifically, at step S481 in FIG. 20, the robotic arm 10 transports the first sample container 21 to the closing part 942*b*. At step S482, the controller 13 transmits a closing start signal to the controller 963 of the closing part 942*b*. When the closing is ended, at step S483, the controller 13 receives a closing end signal from the controller 963 of the closing part 942*b*. Thereafter, at step S49 in FIG. 12, a shutdown process is performed.

Figure 21:
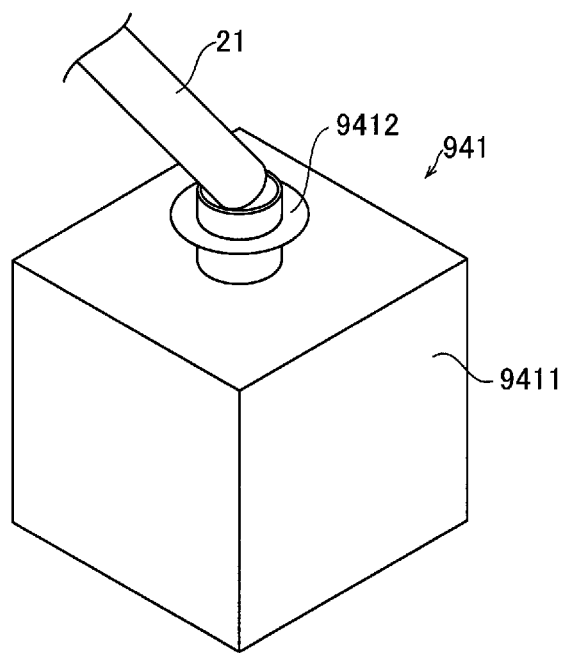
FIG. 21 is a diagram illustrating one example of an agitator.

As illustrated in FIG. 21, the agitator 941 includes a main body part 9411, and a rocking part 9412. The agitator 941 is configured to agitate a content of a container by abutting the container on the rocking part 9412, thereby vibrating the container. A general-purpose mixer may be used as the agitator 941. For example, Digital Vortex-Genie2 manufactured by Scientific Industries may be used as the agitator 941. Moreover, Vortex Mixer 6778 manufactured by Corning Incorporated may be used as the agitator 941.

Figure 22:
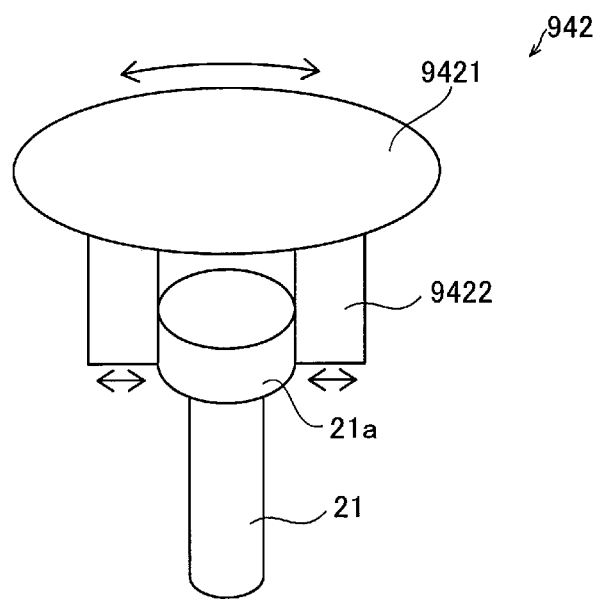
FIG. 22 is a diagram illustrating one example of an opening part and a closing part.

As illustrated in FIG. 22, each of the opening part 942*a* and the closing part 942*b* includes a rotating part 9421, and holding parts 9422 that are supported by the rotating part 9421. The opening part 942*a* and the closing part 942*b* are respectively configured to perform the opening process and the closing process by rotating the rotating part 9421 in a state where the holding parts 9422 hold a plug 21*a* of a container. The holding parts 9422 are capable of approaching each other to an arbitrary distance, and are capable of stably holding a plug having any diameter. A General-purpose automatic plug opening and closing device may be used as the opening part 942*a* and the closing part 942*b*. For example, Cap automatic opening and closing device CAP-NERCPF-100 manufactured by Allied Flow Co., Ltd. may be used as the opening part 942*a* and the closing part 942*b*.

Figure 23:
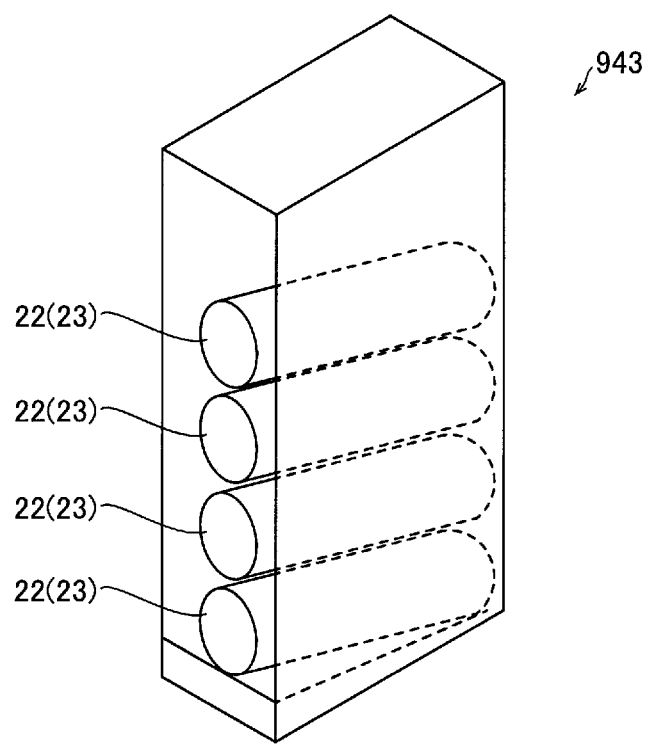
FIG. 23 is a diagram illustrating one example of a centrifuge tube inputting part.

As illustrated in FIG. 23, the centrifuge tube inputting part 943 is configured to hold multiple containers in a state of being piled in the vertical direction. Moreover, a container to be supplied by the centrifuge tube inputting part 943 is held by the hand 15 of the robotic arm 10. The multiple containers are piled in an inclined manner. Note that, the centrifuge tube inputting part 943 may have such a configuration that containers are held by being piled in the vertical direction, and a container is supplied by a button provided on a side surface thereof being pressed. A general-purpose inputting part may be used as the centrifuge tube inputting part 943.

Figure 24:
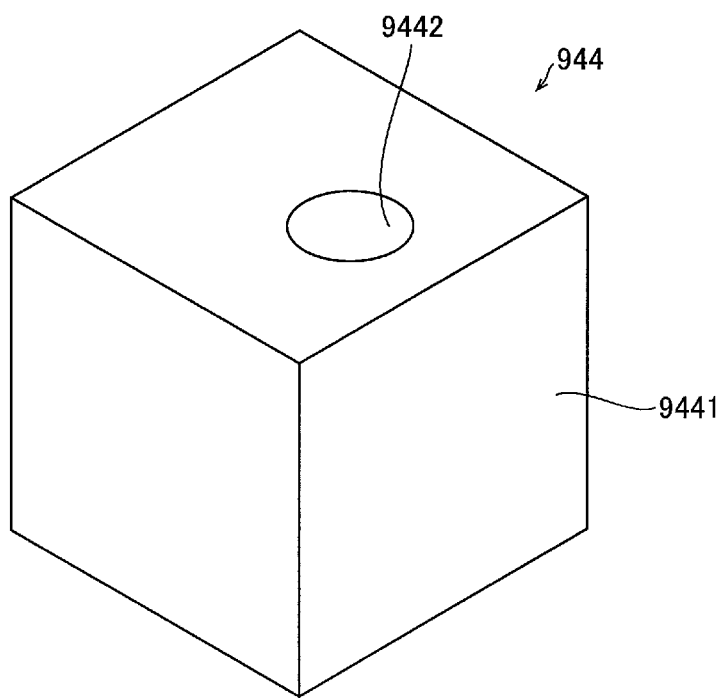
FIG. 24 is a diagram illustrating one example of an information attaching part.

As illustrated in FIG. 24, the information attaching part 944 includes a main body part 9441, and an adhering part 9442. The information attaching part 944 is, for example, an auto labeler. The information attaching part 944 is configured to attach a bar code including prescribed information to a container that is transported with the hand 15 of the robotic arm 10, by the container being inserted into the adhering part 9442. Note that, the information attaching part 944 may attach information other than the bar code to the container. For example, the information attaching part 944 may attach a two-dimensional code, a character, or a symbol to the container. Moreover, the information attaching part 944 may attach information with a seal, or may attach information by printing. A general-purpose auto labeler may be used as the information attaching part 944. For example, BC12TL (Test Tube Labeler System (individual print type)) manufactured by Autonics Corporation may be used as the information attaching part 944.

Figure 25:
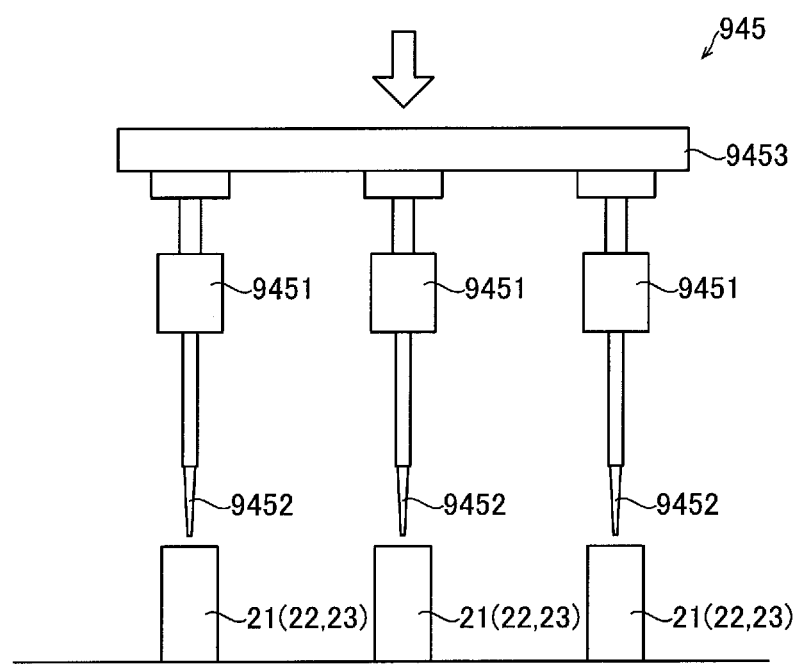
FIG. 25 is a diagram illustrating one example of a dispenser.

As illustrated in FIG. 25, the dispenser 945 includes multiple dispensing pipettes 9451, chips 9452 that are provided on tips of the respective dispensing pipettes 9451, and a driving mechanism 9453 that abuts on upper portions of the multiple dispensing pipettes 9451. The driving mechanism 9453 is coupled to the multiple dispensing pipettes 9451, and drives the multiple dispensing pipettes 9451 concurrently. The driving mechanism 9453 is operated with the hand 15 of the robotic arm 10 to enable the dispenser 945 to perform dispensing processes concurrently by the multiple dispensing pipettes 9451. In other words, the robotic arm 10 operates the driving mechanism 9453 with the hand 15 to enable the first sample and the second sample to be respectively dispensed into the multiple second sample containers 22 and the multiple second sample containers 23, from the multiple first sample containers 21 concurrently. Multiple single pipettes of mL order are arranged in the dispensing pipette 9451. A commercialized product may be used as the dispensing pipette 9451.

The robotic arm 10 may prepare the multiple second sample containers 22 and the multiple second sample container 23 by repeating an operation of respectively dispensing the first sample and the second sample, from the multiple first sample containers 21, into the second sample container 22 and the second sample container 23.

Figure 26:
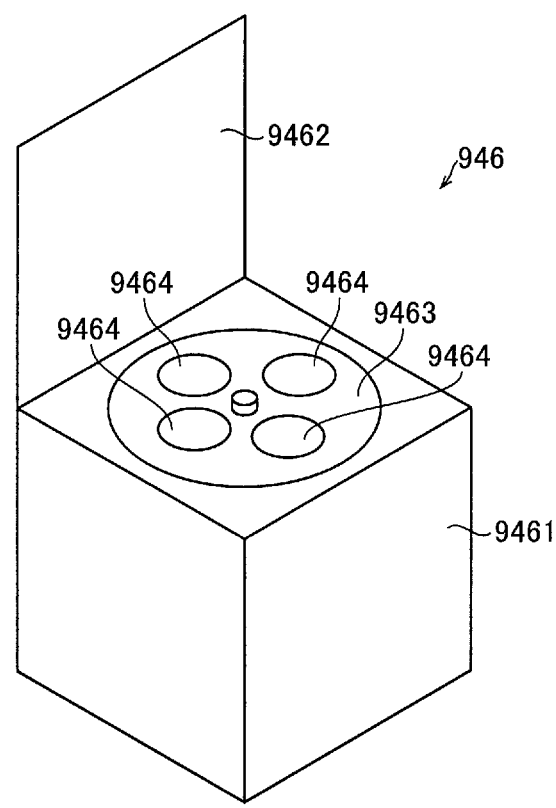
FIG. 26 is a diagram illustrating one example of a centrifuge.

As illustrated in FIG. 26, the centrifuge 946 includes a main body part 9461, a lid part 9462, a rotating part 9463, and multiple container arranging parts 9464 that are provided to the rotating part 9463. The lid part 9462 is configured to be openable and closable. In other words, the lid part 9462 is opened when a container is taken out and put in, and the lid part 9462 is closed in the centrifugation process. Multiple containers are capable of being arranged in each of the container arranging parts 9464. The rotating part 9463 rotates to perform the centrifugation process of contents of the containers that are arranged in the container arranging parts 9464. A container is transported with the hand 15 of the robotic arm 10, and is set to the centrifuge 946. A general-purpose centrifugation device may be used as the centrifuge 946. For example, Universal Refrigerated Centrifuge 5930 manufactured by KUBOTA CORPORATION may be used as the centrifuge 946. Moreover, ROTANTA460 ROBOTIC manufactured by Hettich may be used as the centrifuge 946.

(Configuration of Sample Pretreatment Apparatus)

Figure 27:
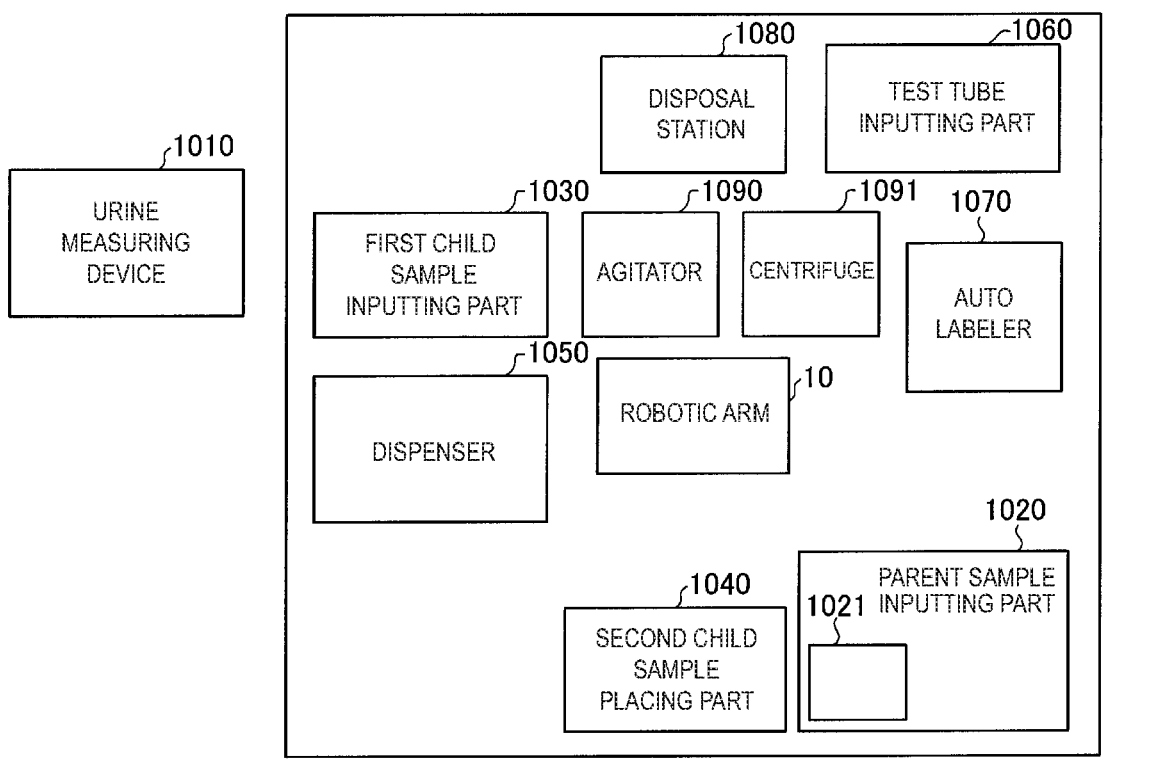
FIG. 27 is a diagram illustrating a configuration of a sample pretreatment apparatus according to a second embodiment.

With reference to FIG. 27, an example of a sample pretreatment apparatus 1000 according to a second embodiment is explained. Note that, configurations similar to those in a first embodiment are assigned with the same reference numerals, and explanations thereof are omitted.

The sample pretreatment apparatus 1000 of a second embodiment includes, as illustrated in FIG. 27, the robotic arm 10, a urine measuring device 1010, a parent sample inputting part 1020, a first child sample inputting part 1030, a second child sample placing part 1040, a dispenser 1050, a test tube inputting part 1060, an auto labeler 1070, a disposal station 1080, an agitator 1090, and a centrifuge 1091. The parent sample inputting part 1020 includes a bar code reader 1021.

The sample pretreatment apparatus 1000 of a second embodiment is a device for performing a measurement of urine. For example, the sample pretreatment apparatus 1000 performs tests of urobilinogen, occult blood, protein, glucose, ketone body, bilirubin, nitrite, white blood cells, pH, creatinine, albumin, and the like, or performs a pretreatment for these tests. For tests of urine, multiple measurements are performed to enable the tests to be performed with higher accuracy.

A sample in a cup serving as the first sample container 21 is supplied from the parent sample inputting part 1020. The agitator 1090 agitates the supplied sample in the cup. The dispenser 1050 dispenses a predetermined amount of the parent sample thus agitated into each of the second sample container 22 and the second sample container 23. Thereafter, the cup serving as the first sample container 21 is disposed of to the disposal station 1080. Each of the second sample container 22 and the second sample container 23 is supplied from the test tube inputting part 1060, and is attached with information based on bar code information of the first sample container 21 by the auto labeler 1070. The second sample container 22 is then transported to the first child sample inputting part 1030, and is subjected to a measurement by the urine measuring device 1010. The first sample is automatically subjected to a urine qualitative measurement by the urine measuring device 1010.

The second sample container 23 is subjected to a centrifugation process by the centrifuge 1091. Moreover, after the dispenser 1050 removes the supernatant of the second sample that is subjected to the centrifugation, the second sample is transported to the second child sample placing part 1040. A test for the second sample is manually executed using a microscope. In other words, as for the second sample that is used in a visual measurement, the robotic arm 10 transports the second sample container 23 to a sample pretreatment section in a group including the dispenser 1050 and the centrifuge 1091.

(Configuration of Sample Pretreatment Apparatus)

Figure 28:
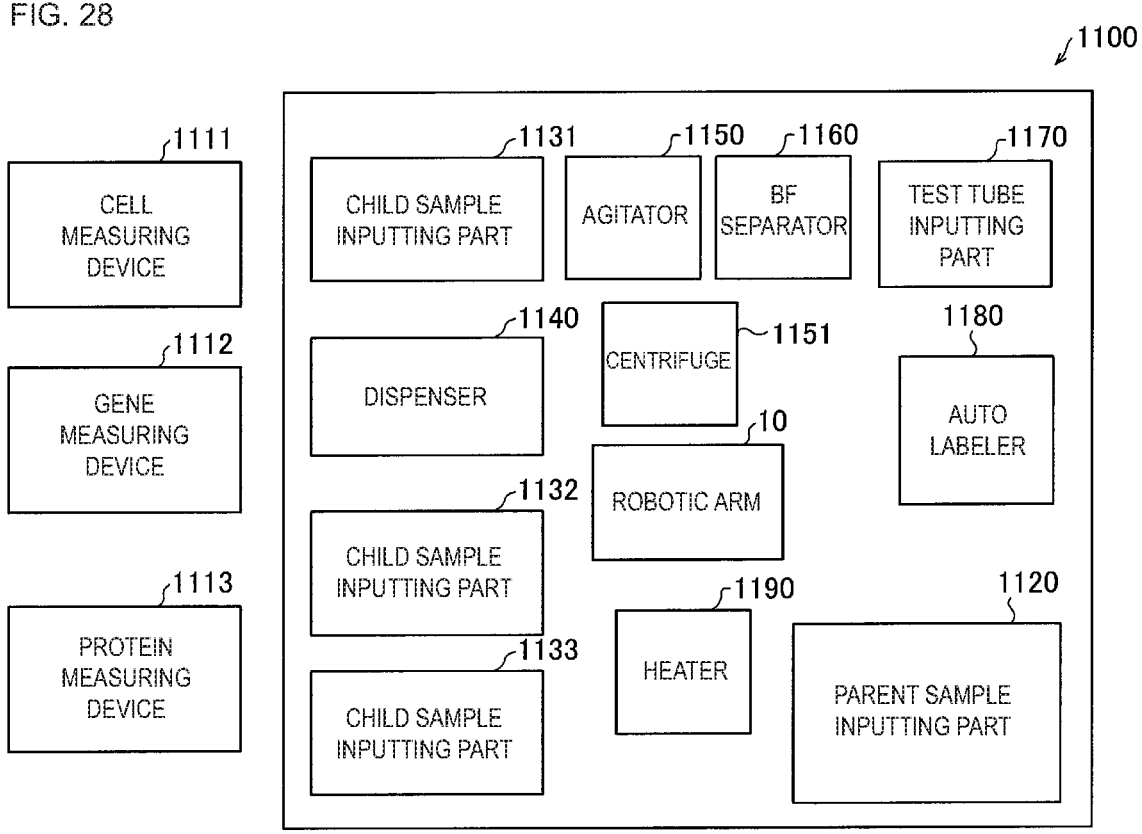
FIG. 28 is a diagram illustrating a configuration of a sample pretreatment apparatus according to a third embodiment.

With reference to FIG. 28, an example of a sample pretreatment apparatus 1100 according to a third embodiment is explained. Note that, configurations similar to those in a first embodiment are assigned with the same reference numerals, and explanations thereof are omitted.

The sample pretreatment apparatus 1100 of a third embodiment includes, as illustrated in FIG. 28, the robotic arm 10, a cell measuring device 1111, a gene measuring device 1112, a protein measuring device 1113, a parent sample inputting part 1120, child sample inputting parts 1131, 1132, and 1133, a dispenser 1140, an agitator 1150, a centrifuge 1151, a BF separator 1160, a test tube inputting part 1170, an auto labeler 1180, and a heater 1190.

The sample pretreatment apparatus 1100 of a third embodiment is a device for performing a measurement of formalin-fixation paraffin embedding (FFPE). For example, the sample pretreatment apparatus 1100 performs a measurement of PD-L1 on the surface of a cancer cell, a measurement of mutation of a PD-L1 gene in the cancer cell, a measurement of a PD-L1 protein separated from the cancer cell, and the like, or performs a pretreatment for these tests. Note that, the cell measurement, the gene measurement, and the protein measurement may be performed about the cultured cell or whole blood. For tests of the sample, multiple measurements are performed to enable the tests to be performed with higher accuracy.

A sample in which FFPE is deparaffinized and hydrophilized is supplied from the parent sample inputting part 1120, as a parent sample. The agitator 1150 agitates the supplied parent sample. The dispenser 1140 dispenses a predetermined amount of a cell sample of the parent sample thus agitated with a cell pipette. Moreover, the dispenser 1140 dispenses a predetermined amount of a gene sample of the parent sample with a gene pipette. Moreover, the dispenser 1140 dispenses a predetermined amount of a protein sample of the parent sample with a protein pipette. Each of a sample container into which the cell sample is dispensed, a sample container into which the gene sample is dispensed, and a sample container into which the protein sample is dispensed is supplied from the test tube inputting part 1170, and is attached with information based on bar code information of the first sample container 21 by the auto labeler 1180.

The cell sample is subjected to an antigen activating process. Specifically, the cell sample is dispensed into an antigen retrieval solution heated by the heater 1190. The cell sample is transported to the child sample inputting part 1131, and is measured by the cell measuring device 1111. In other words, when the child sample is used for a measurement of a substance that is expressed on the surface of the cell, the robotic arm 10 transports the sample container to a sample pretreatment section in a group including the dispenser 1140 and a reagent dispenser (for example, the dispenser 1140) for dispensing a reagent that activates the substance.

The gene sample is subjected to a cell dissolution process. Specifically, Lysisbuffer and ProteinaseK are dispensed into the gene sample. The heater 1190 then heats the gene sample. The gene sample is then subjected to a nucleic acid extracting process. Specifically, the dispenser 1140 adds magnetic beads. Nucleic acids are adsorbed by the added magnetic beads. Thereafter, the gene sample is subjected to a BF separating process by the BF separator 1160. This removes unnecessary components. Thereafter, an eluate is added, and the nucleic acid is eluted. The gene sample is transported to the child sample inputting part 1132, and is measured by the gene measuring device 1112. In other words, when the sample is used for a measurement of the gene mutation in the cell, the robotic arm 10 transports the sample container to a sample pretreatment section in a group including the dispenser 1140, a reagent dispenser (for example, the dispenser 1140) for dispensing a reagent that dissolves the cell, the heater 1190, and a nucleic acid extracting part (for example, the dispenser 1140 and the BF separator 1160).

The dispenser 1140 adds ethanol to the protein sample. The agitator 1150 then agitates the protein sample. Thereafter, the protein sample is subjected to a centrifugation process by the centrifuge 1151. The dispenser 1140 removes the supernatant of the protein sample that is subjected to the centrifugation process. The protein sample is transported to the child sample inputting part 1133, and is measured by the protein measuring device 1113. In other words, when the sample is used for a measurement of a protein in the cell, the robotic arm 10 transports the sample container to a sample pretreatment section in a group including the dispenser 1140, a reagent dispenser (For example, the dispenser 1140) for dispensing ethanol, and the centrifuge 1151. Note that, this group may include the agitator 1150.

Moreover, the dispenser 1140 of the sample pretreatment apparatus 1100 may include a reagent dispenser, serving as a sample pretreatment section, which dispenses a first reagent in accordance with a first measurement to the second sample container 22, and dispenses a second reagent, different from the first reagent, in accordance with a second measurement to the second sample container 23. For example, the first reagent is a reagent that activates the cell, and the second reagent is a reagent that dissolves the cell.

(Configuration of Sample Pretreatment Apparatus)

Figure 29:
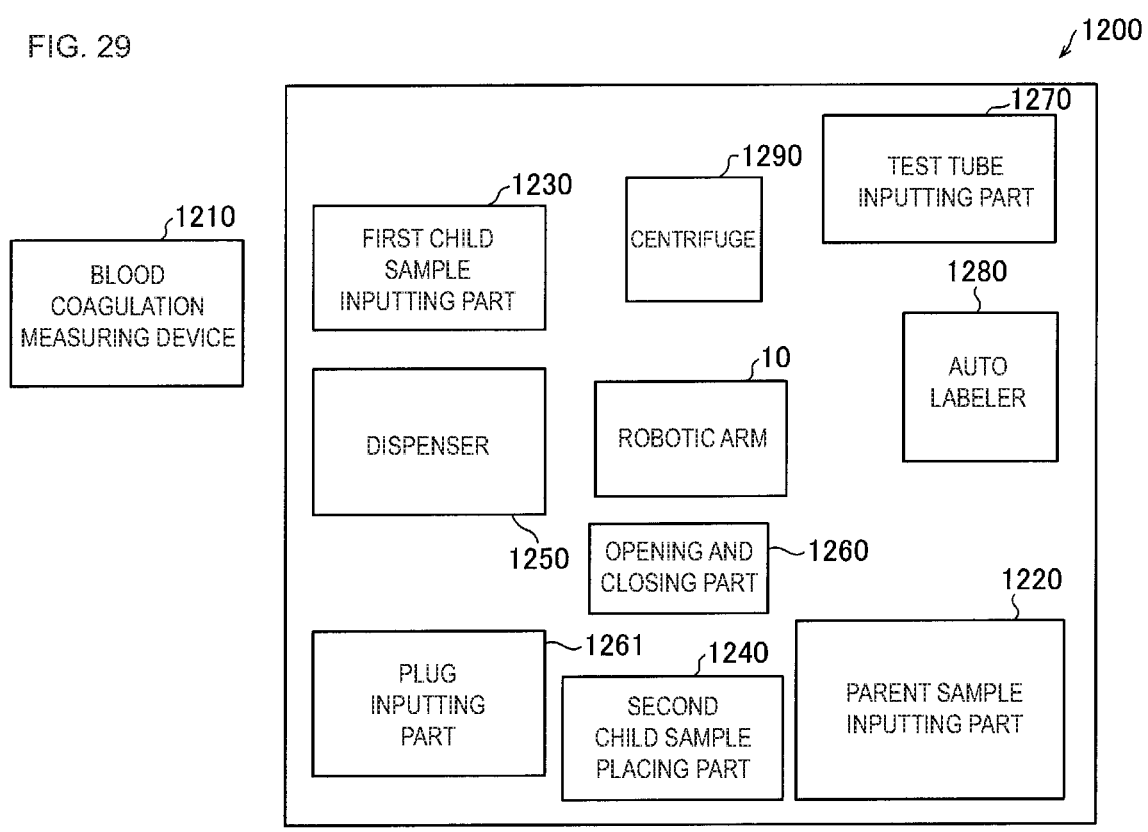
FIG. 29 is a diagram illustrating a configuration of a sample pretreatment apparatus according to a fourth embodiment.

With reference to FIG. 29, an example of a sample pretreatment apparatus 1200 according to a fourth embodiment is explained. Note that, configurations similar to those in a first embodiment are assigned with the same reference numerals, and explanations thereof are omitted.

The sample pretreatment apparatus 1200 of a fourth embodiment includes, as illustrated in FIG. 29, the robotic arm 10, a blood coagulation measuring device 1210, a parent sample inputting part 1220, a first child sample inputting part 1230, a second child sample placing part 1240, a dispenser 1250, an opening and closing part 1260, a plug inputting part 1261, a test tube inputting part 1270, an auto labeler 1280, and a centrifuge 1290.

The sample pretreatment apparatus 1200 of a fourth embodiment is a device for performing a coagulation measurement of blood. For example, the sample pretreatment apparatus 1200 performs tests of PT, APTT, Fbg, TT0, HpT, factor quantification, ATIII, APL, PIg, PC, D dimer, FDP, and the like, or performs a pretreatment for these tests.

The centrifuge 1290 performs the centrifugation process to a sample that is accommodated in the first sample container 21 and supplied from the parent sample inputting part 1220. The dispenser 1250 dispenses a predetermined amount of the parent sample that is subjected to the centrifugation to the second sample container 22. The first sample contains blood platelets. The second sample container 22 is supplied from the test tube inputting part 1270, and is attached with information based on bar code information of the first sample container 21 by the auto labeler 1280.

The second sample container 22 is then transported to the first child sample inputting part 1230, and is subjected to a measurement by the blood coagulation measuring device 1210. In other words, the first sample is subjected to a coagulation test of blood platelet agglutination by the blood coagulation measuring device 1210.

The first sample container 21 into which the first sample is dispensed is subjected to the centrifugation process by the centrifuge 1290. The dispenser 1250 dispenses a predetermined amount of the parent sample that is subjected to the centrifugation to the second sample container 23. The second sample contains no blood platelet. The second sample container 23 is supplied from the test tube inputting part 1270, and is attached with information based on bar code information of the first sample container 21 by the auto labeler 1280. The second sample container 23 is transported to the second child sample placing part 1240. The second sample is stored for a coagulation test different from the blood platelet agglutination.

(Configuration of Sample Pretreatment Apparatus)

Figure 30:
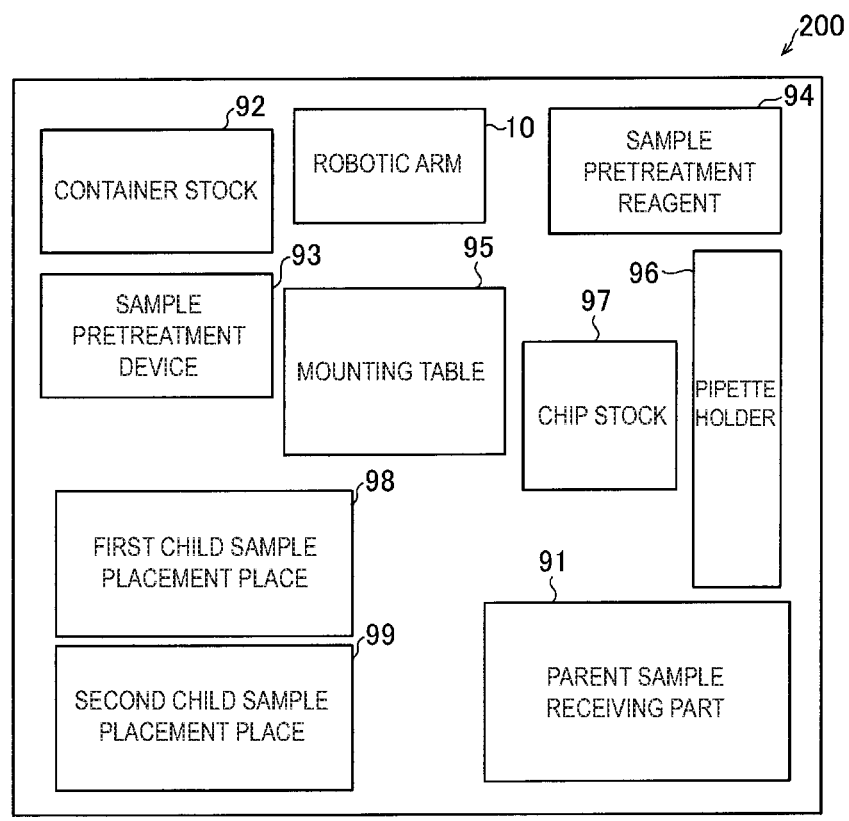
FIG. 30 is a diagram illustrating a configuration of a sample pretreatment apparatus according to a fifth embodiment.

With reference to FIG. 30, an example of a sample pretreatment apparatus 200 according to a fifth embodiment is explained. The sample pretreatment apparatus 200 performs a pretreatment that prepares a first sample to be supplied from a parent sample to the first measuring device 30 (see FIG. 1), and a second sample to be supplied to the second measuring device 40 (see FIG. 1) that performs a measurement based on a principle different from that of the first measuring device 30.

The sample pretreatment apparatus 200 includes, as illustrated in FIG. 30, the robotic arm 10, a parent sample receiving part 91, a container stock 92, a sample pretreatment device 93, a sample pretreatment reagent 94, a mounting table 95, a pipette holder 96, a chip stock 97, a first child sample placement place 98, and a second child sample placement place 99.

The parent sample receiving part 91 receives the first sample container 21 in which a parent sample is accommodated. The container stock 92 stocks the empty second sample containers 22 and empty the second sample containers 23.

The sample pretreatment device 93 is a device necessary for a pretreatment of the sample. For example, the sample pretreatment device 93 includes a centrifuge, a thermostat bath, an agitation device, and the like. Note that, when the pretreatment only includes the dispensing and the mixing with the respective reagents, this device does not need to be provided.

The sample pretreatment reagent 94 stores therein a reagent necessary for the pretreatment. The mounting table 95 is a working table on which items necessary for the work are mounted. The first sample container 21, the second sample container 22, and the second sample container 23 are mounted on the mounting table 95. Moreover, a reagent container may be mounted on the mounting table 95.

The pipette holder 96 holds dispensing pipettes of multiple types. Multiple dispensing pipettes are prepared depending on the dispensing amounts. The dispensing pipette is held by the robotic arm 10, and is used for the dispensing. Multiple chips are prepared in the chip stock 97. The chip of the chip stock 97 is attached on the tip of the dispensing pipette, and is exchanged for every dispensing.

The second sample container 22 in which the first sample that is subjected to the pretreatment is accommodated is placed in the first child sample placement place 98. The second sample container 22 that is placed in the first child sample placement place 98 is transported to the first measuring device 30, and is subjected to a measurement. The second sample container 23 in which the second sample that is subjected to the pretreatment is accommodated is placed in the second child sample placement place 99. The second sample container 23 that is placed in the second child sample placement place 99 is transported to the second measuring device 40, and is subjected to a measurement.

Here, in a fifth embodiment, the robotic arm 10 transports the second sample container 22 in which the first sample is accommodated and the second sample container 23 in which the second sample is accommodated so as to be subjected to different pretreatments.

Moreover, the robotic arm 10 is configured to receive a dispensing pipette from the pipette holder 96, and perform the dispensing process. Specifically, the robotic arm 10 uses the dispensing pipette to dispense the first sample and the second sample from the parent sample. Moreover, the robotic arm 10 uses the dispensing pipette to dispense a reagent.

(Configuration of Sample Pretreatment Apparatus)

Figure 31:
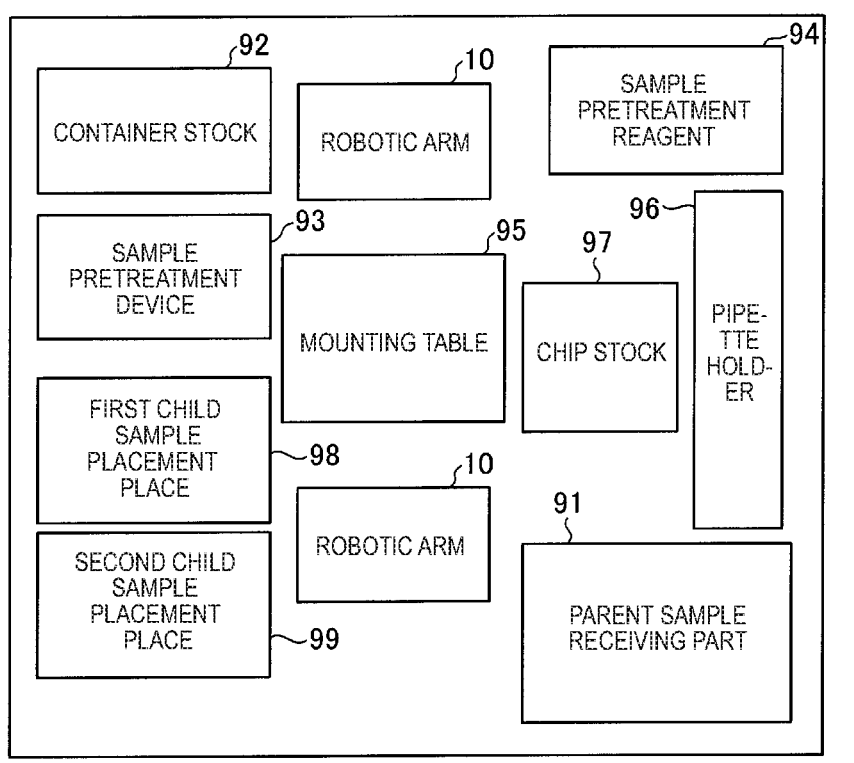
FIG. 31 is a diagram illustrating a configuration of a sample pretreatment apparatus according to a sixth embodiment.

With reference to FIG. 31, an example of a sample pretreatment apparatus 300 according to a sixth embodiment is explained. Note that, configurations similar to those in a fifth embodiment are assigned with the same reference numerals, and explanations thereof are omitted.

The sample pretreatment apparatus 300 of a sixth embodiment includes, as illustrated in FIG. 31, two robotic arms 10, the parent sample receiving part 91, the container stock 92, the sample pretreatment device 93, the sample pretreatment reagent 94, the mounting table 95, the pipette holder 96, the chip stock 97, the first child sample placement place 98, and the second child sample placement place 99.

Here, in a sixth embodiment, the two robotic arms 10 transport the second sample container 22 in which the first sample is accommodated and the second sample container 23 in which the second sample is accommodated so as to be subjected to different pretreatments.

Moreover, the two robotic arms 10 cooperate with each other to perform the transport operation and the dispensing operation.

(Configuration of Sample Pretreatment Apparatus)

Figure 32:
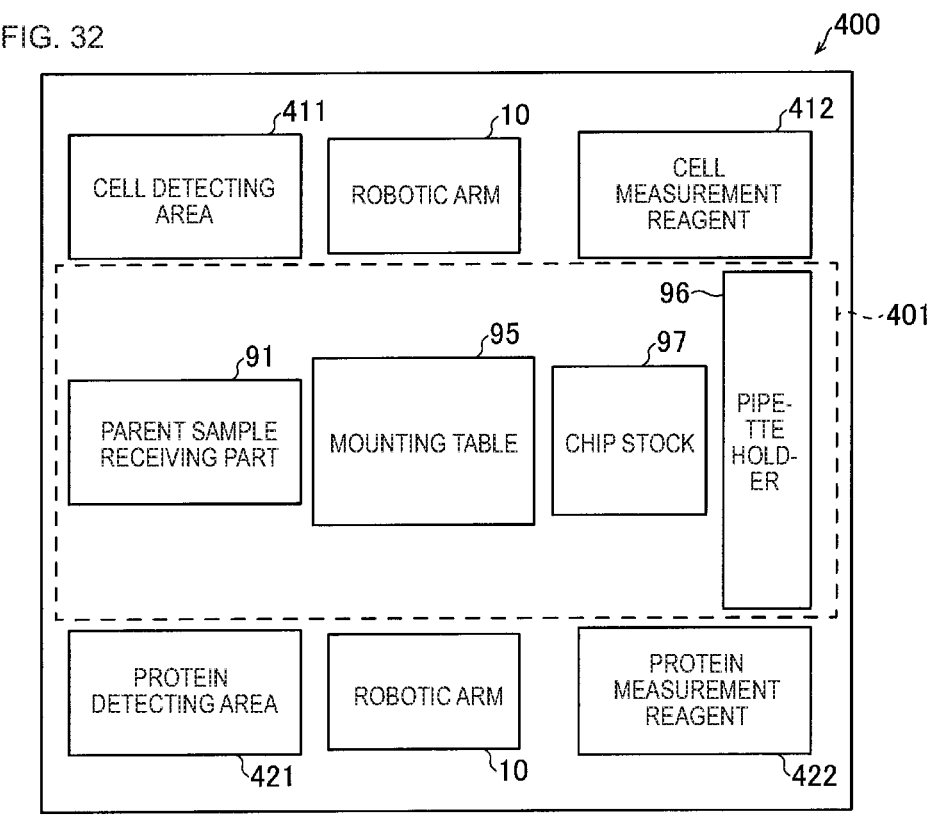
FIG. 32 is a diagram illustrating a configuration of a sample pretreatment apparatus according to a seventh embodiment.

With reference to FIG. 32, an example of a sample pretreatment apparatus 400 according to a seventh embodiment is explained. Note that, configurations similar to those in fifth and sixth embodiments are assigned with the same reference numerals, and explanations thereof are omitted.

The sample pretreatment apparatus 400 of a seventh embodiment includes, as illustrated in FIG. 32, the two robotic arms 10, the parent sample receiving part 91, the mounting table 95, the pipette holder 96, the chip stock 97, a cell detecting area 411, a cell measurement reagent 412, a protein detecting area 421, and a protein measurement reagent 422.

The parent sample receiving part 91, the mounting table 95, the pipette holder 96, and the chip stock 97 are provided in a common area 401 that is used by the two robotic arms 10 in common. Moreover, the sample pretreatment apparatus 400 includes an area where a cell is measured and an area where a protein is measured with the common area 401 being sandwiched therebetween. The cell detecting area 411, the robotic arm 10, and the cell measurement reagent 412 are provided in the area where a cell is measured. The protein detecting area 421, the robotic arm 10, and the protein measurement reagent 422 are provided in the area where a protein is measured.

An optical unit that detects a stained cell is provided in the cell detecting area 411. A stain reagent for detecting a cell is provided in the cell measurement reagent 412.

A plate reader that detects a protein is provided in the protein detecting area 421. A reagent such as an antibody for detection is provided in the protein measurement reagent 422.

(Work Process by Robotic Arms)

Figure 33:
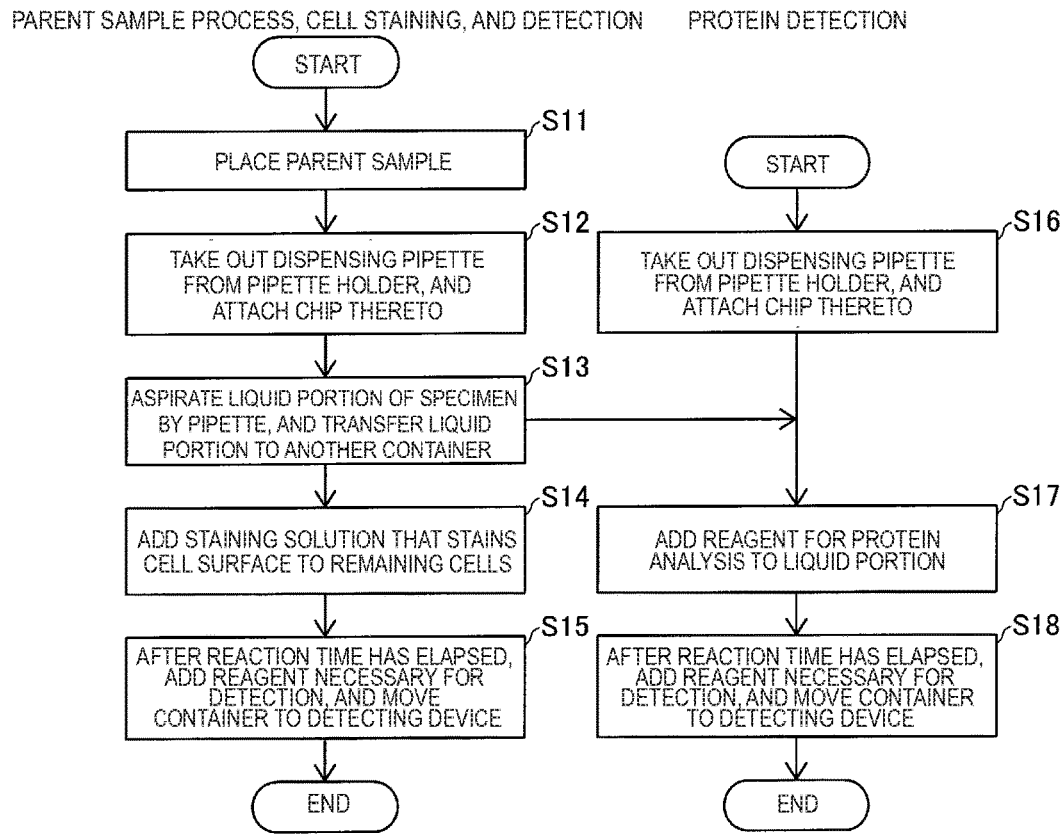
FIG. 33 is a flow diagram illustrating a work process performed by robotic arms of a sample pretreatment apparatus of a seventh embodiment.

With reference to FIG. 33, a work process by the robotic arms 10 in the sample pretreatment apparatus 400 according to a seventh embodiment is explained. One of the two robotic arms 10 performs step S11 to step S15. Moreover, the other robotic arm 10 performs step S16 to step S18.

At step S11, a parent sample is placed on the mounting table 95. Specifically, the robotic arm 10 transports and places the first sample container 21 placed on the parent sample receiving part 91, on the mounting table 95. At step S12, a dispensing pipette is taken out from the pipette holder 96. Moreover, a chip of the chip stock 97 is attached on a tip of the dispensing pipette.

At step S13, a liquid portion of a specimen is aspirated by the dispensing pipette, and is transferred to another container. At step S14, a staining solution that stains the cell surface is added to the remaining cells.

At step S15, after the reaction time has elapsed, a reagent necessary for the detection of a cell is added, and the container is transported to a detecting device. Thereafter, the parent sample process, and the cell staining and detecting process are ended.

In parallel with the processes from step S11 to step S15, the other robotic arm 10 performs processes from step S16 to step S18. At step S16, a dispensing pipette is taken out from the pipette holder 96. Moreover, a chip of the chip stock 97 is attached on a tip of the dispensing pipette. At step S17, a reagent for a protein analysis is added to the liquid portion of the specimen.

At step S18, after the reaction time has elapsed, a reagent necessary for the detection of a protein is added, and the container is transported to a detecting device. Thereafter, the process of detection of a protein detect is ended.

(Configuration of Sample Pretreatment Apparatus)

Figure 34:
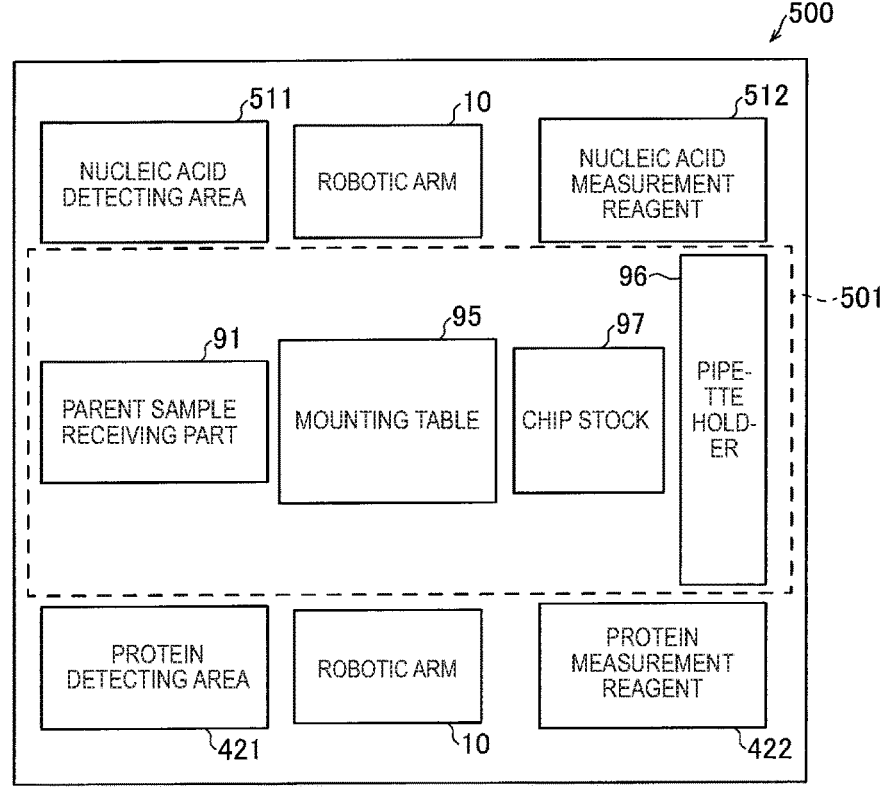
FIG. 34 is a diagram illustrating a configuration of a sample pretreatment apparatus according to an eighth embodiment.

With reference to FIG. 34, an example of a sample pretreatment apparatus 500 according to an eighth embodiment is explained. Note that, configurations similar to those in fifth to seventh embodiments are assigned with the same reference numerals, and explanations thereof are omitted.

The sample pretreatment apparatus 500 of an eighth embodiment includes, as illustrated in FIG. 34, the two robotic arms 10, the parent sample receiving part 91, the mounting table 95, the pipette holder 96, the chip stock 97, a nucleic acid detecting area 511, a nucleic acid measurement reagent 512, the protein detecting area 421, and the protein measurement reagent 422.

The parent sample receiving part 91, the mounting table 95, the pipette holder 96, and the chip stock 97 are provided in a common area 501 that is used by the two robotic arms 10 in common. Moreover, the sample pretreatment apparatus 500 includes an area where a nucleic acid is measured and an area where a protein is measured with the common area 501 being sandwiched therebetween. The nucleic acid detecting area 511, the robotic arm 10, and the nucleic acid measurement reagent 512 are provided in the area where a nucleic acid is measured. The protein detecting area 421, the robotic arm 10, and the protein measurement reagent 422 are provided in the area where a protein is measured.

A spectrophotometer that detects a nucleic acid is provided in the nucleic acid detecting area 511. A reagent for processing a nucleic acid is provided in the nucleic acid measurement reagent 512.

A plate reader that detects a protein is provided in the protein detecting area 421. A reagent such as an antibody for detection is provided in the protein measurement reagent 422.

(Configuration of Sample Pretreatment Apparatus)

Figure 35:
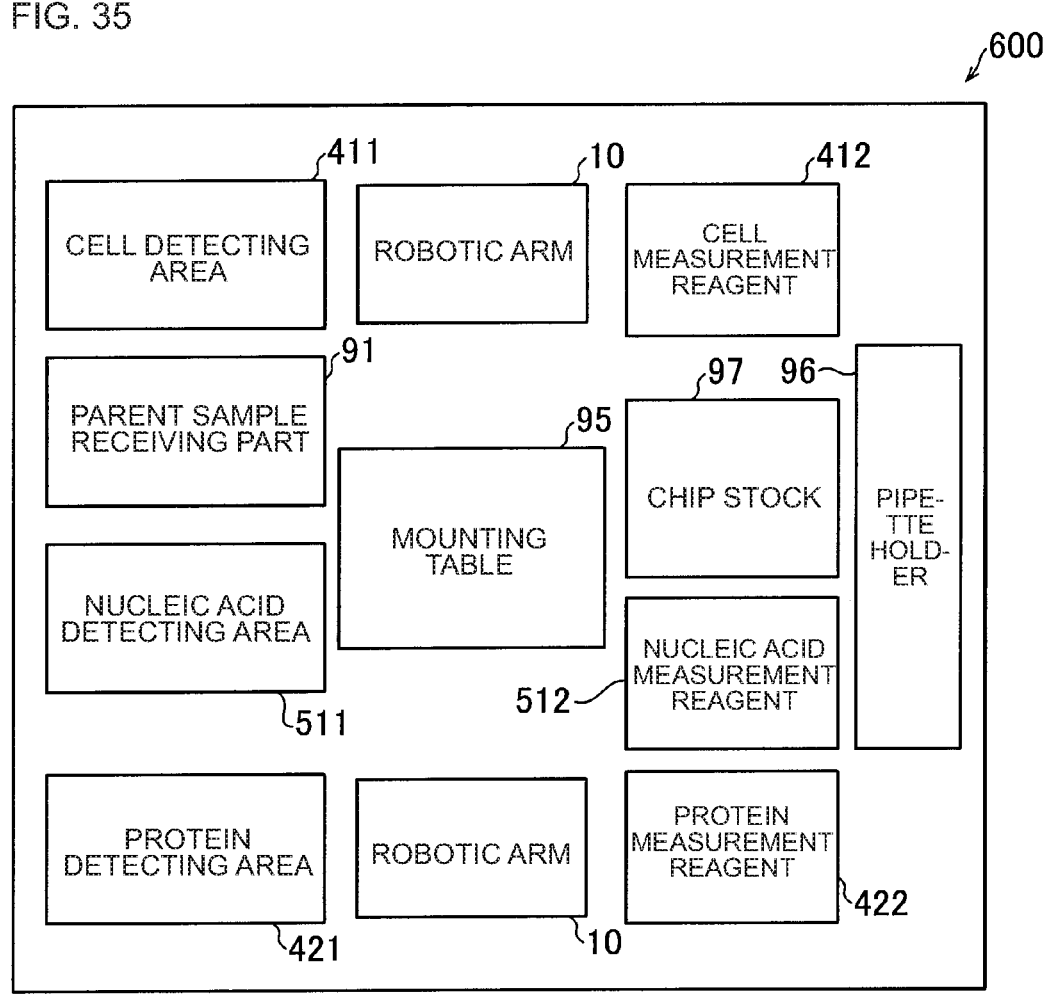
FIG. 35 is a diagram illustrating a configuration of a sample pretreatment apparatus according to a ninth embodiment.

With reference to FIG. 35, an example of a sample pretreatment apparatus 600 according to a ninth embodiment is explained. Note that, configurations similar to those in fifth to eighth embodiments are assigned with the same reference numerals, and explanations thereof are omitted.

The sample pretreatment apparatus 600 of a ninth embodiment includes, as illustrated in FIG. 35, the two robotic arms 10, the parent sample receiving part 91, the mounting table 95, the pipette holder 96, the chip stock 97, the cell detecting area 411, the cell measurement reagent 412, the protein detecting area 421, the protein measurement reagent 422, the nucleic acid detecting area 511, and the nucleic acid measurement reagent 512.

In the nucleic acid detecting area 511, the nucleic acid extraction and PCR are performed to perform a gene measurement. In the cell detecting area 411, immunostaining is performed to perform a cell measurement. In the protein detecting area 421, Enzyme-Linked ImmunoSorbent Assay (ELISA) is performed to perform a protein measurement.

(Work Process by Robotic Arms)

Figure 36:
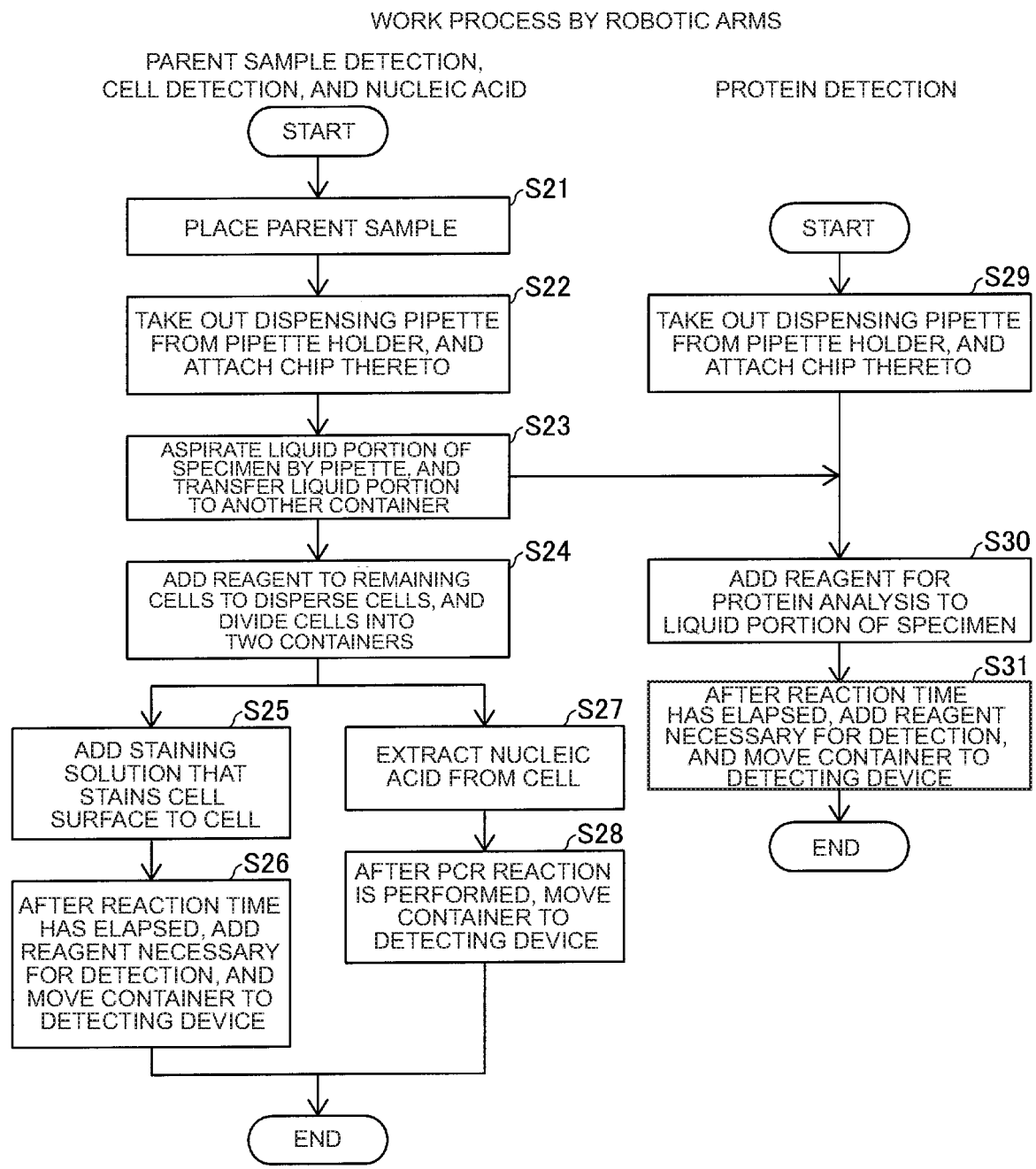
FIG. 36 is a flow diagram illustrating a work process performed by robotic arms of a sample pretreatment apparatus of a ninth embodiment.

With reference to FIG. 36, a work process by the robotic arms 10 in the sample pretreatment apparatus 600 according to a ninth embodiment is explained. One of the two robotic arms 10 performs step S21 to step S26. Moreover, the other robotic arm 10 performs step S29 to step S31.

At step S21, a parent sample is placed on the mounting table 95. Specifically, the robotic arm 10 transports and places the first sample container 21 that is placed on the parent sample receiving part 91, on the mounting table 95. At step S22, a dispensing pipette is taken out from the pipette holder 96. Moreover, a chip of the chip stock 97 is attached on a tip of the dispensing pipette.

At step S23, a liquid portion of a specimen is aspirated by the dispensing pipette, and transferred to another container. At step S24, a reagent is added to the remaining cells to disperse the cells. The dispersed cells are then divided into two containers.

At step S25, a staining solution that stains the cell surface is added to the cells within one of the divided two containers. At step S26, after the reaction time has elapsed, a reagent necessary for the detection of a cell is added, and the container is transported to a detecting device.

At step S27, a nucleic acid is extracted from the cells in the other container, out of the two divided containers. At step S28, after a polymerase chain reaction (PCR reaction) is performed, the container is transported to a detecting device. Thereafter, the parent sample process, and the cell staining and detecting process are ended.

In parallel with the processes from step S21 to step S28, the other robotic arm performs processes from step S29 to step S31. At step S29, a dispensing pipette is taken out from the pipette holder 96. Moreover, a chip of the chip stock 97 is attached on a tip of the dispensing pipette. At step S30, a reagent for a protein analysis is added to the liquid portion of the specimen.

At step S31, after the reaction time has elapsed, a reagent necessary for the detection of a protein is added, and the container is transported to a detecting device. Thereafter, the process of detection of a protein detect is ended.

(Configuration of Sample Pretreatment Apparatus)

Figure 37:
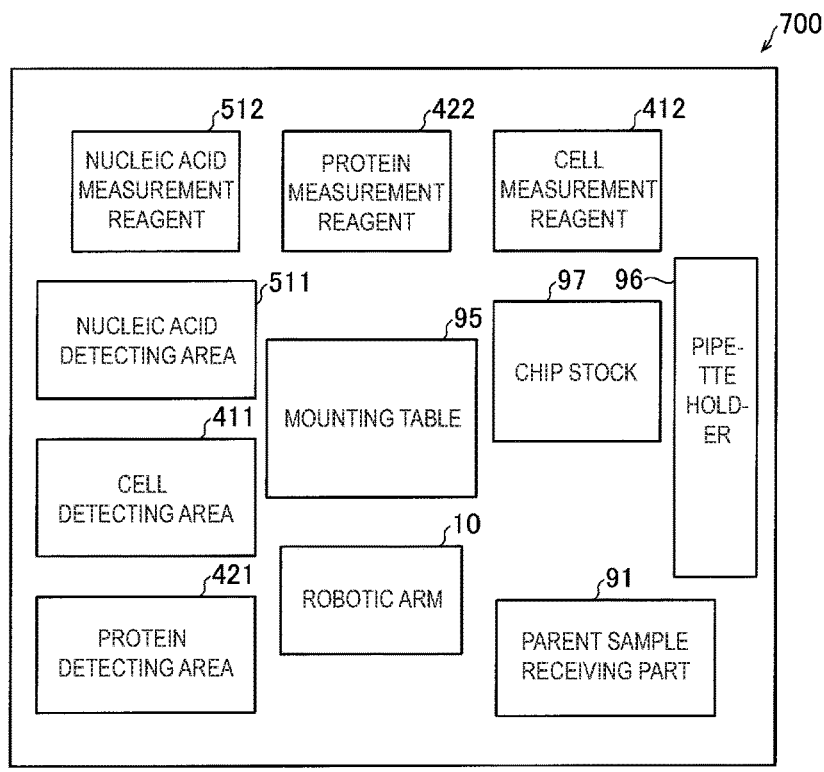
FIG. 37 is a diagram illustrating a configuration of a sample pretreatment apparatus according to a tenth embodiment.

With reference to FIG. 37, an example of a sample pretreatment apparatus 700 according to a tenth embodiment is explained. Note that, configurations similar to those in fifth to ninth embodiments are assigned with the same reference numerals, and explanations thereof are omitted.

The sample pretreatment apparatus 700 of a tenth embodiment includes as illustrated in FIG. 37, one robotic arm 10, the parent sample receiving part 91, the mounting table 95, the pipette holder 96, the chip stock 97, the cell detecting area 411, the cell measurement reagent 412, the protein detecting area 421, the protein measurement reagent 422, the nucleic acid detecting area 511, and the nucleic acid measurement reagent 512.

In the sample pretreatment apparatus 700, using one robotic arm, a pretreatment of a gene measurement by nucleic acid extraction and PCR and a pretreatment of a protein measurement by ELISA are performed.

(Configuration of Sample Pretreatment Apparatus)

Figure 38:
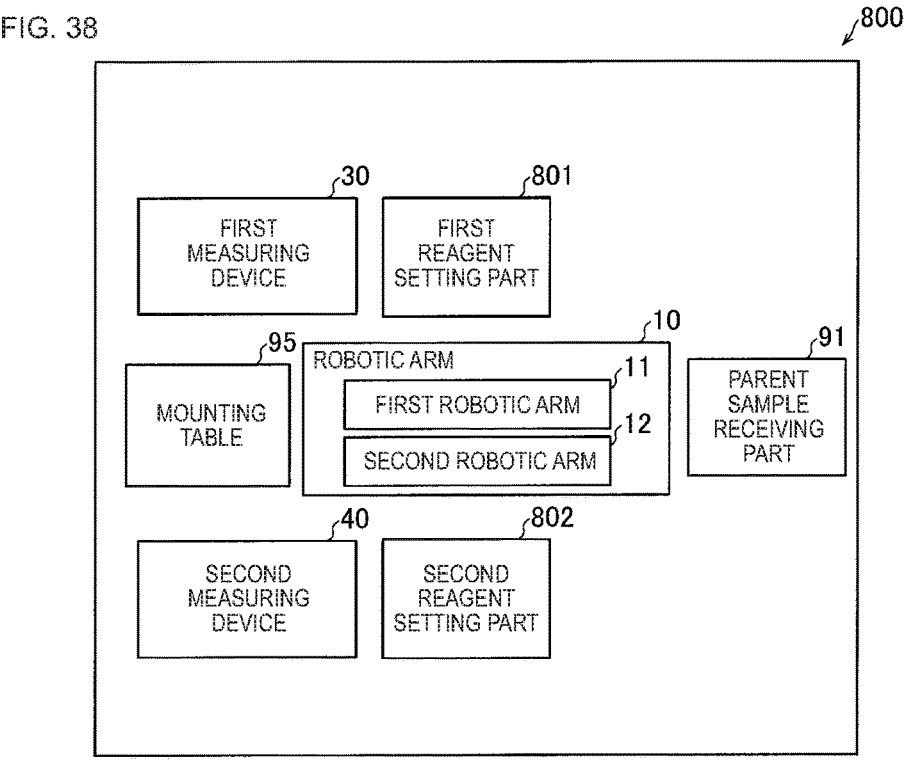
FIG. 38 is a diagram illustrating a configuration of a sample pretreatment apparatus according to an eleventh embodiment.

With reference to FIG. 38, an example of a sample pretreatment apparatus 800 according to an eleventh embodiment is explained. Note that, configurations similar to those in fifth to tenth embodiments are assigned with the same reference numerals, and explanations thereof are omitted.

The sample pretreatment apparatus 800 of an eleventh embodiment includes, as illustrated in FIG. 38, the robotic arm 10, the first measuring device 30, the second measuring device 40, the parent sample receiving part 91, the mounting table 95, a first reagent setting part 801, and a second reagent setting part 802. The robotic arm 10 includes the first robotic arm 11 and the second robotic arm 12.

A first reagent container in which a first reagent is accommodated for a measurement by the first measuring device 30 is provided in the first reagent setting part 801. A second reagent container in which a second reagent is accommodated for a measurement by the second measuring device 40 is provided in the second reagent setting part 802. The first reagent setting part 801 and the second reagent setting part 802 have a function of keeping cool or keeping warm so as to have a temperature suitable for storing a reagent.

The robotic arm 10 is arranged between the first reagent setting part 801 and the second reagent setting part 802. This enables the robotic arm 10 to easily access both of the first reagent setting part 801 and the second reagent setting part 802, so that the work efficiency of the robotic arm 10 can be improved.

Moreover, the mounting table 95 and the parent sample receiving part 91 are arranged in a region between the first reagent setting part 801 and the second reagent setting part 802.

The first robotic arm 11 has a function of holding the first dispensing pipette such that the first reagent is dispensed from the first reagent container into the second sample container 22. Moreover, the second robotic arm 12 has a function of holding the second dispensing pipette such that the second reagent is dispensed from the second reagent container to the second sample container 23.

Moreover, the first robotic arm 11 has a function of holding and transporting the second sample container 22 to the mounting table 95. Moreover, the second robotic arm 12 has a function of holding and transporting the second sample container 23 to the mounting table 95.

Moreover, the first robotic arm 11 and the second robotic arm 12 respectively have functions of holding again and transporting the second sample container 22 and the second sample container 23, from the mounting table 95. This enables the second sample container 22 and the second sample container 23 to be transferred from one of the first robotic arm 11 and the second robotic arm 12 to the other, so that in a range where a work range of the first robotic arm 11 and a work range of the second robotic arm are overlapped with each other, it is possible to easily transport the second sample container 22 and the second sample container 23.

Note that, it should be considered that the embodiments disclosed herein are merely examples, and are not limited thereto. The scope of the present invention is indicated by not the explanations for the above-described embodiments but by the claims, and includes all the changes (modifications) within the meaning and the range equivalent to the scope of claims.

The invention claimed is:

1. A sample pretreatment apparatus comprising:
a plurality of sample pretreatment devices, each of which executes a sample pretreatment prior to a measurement;
a sample dispenser configured to dispense a sample in a first sample container into a second sample container;
a controller; and
a robotic arm comprising:
an articulated arm member; and
a hand attached to the articulated arm member, wherein,
the controller is programed to, in response to determining that the sample in the first sample container is subject to first and second measurements different from each other,
control the sample dispenser to dispense the sample from the first sample container to one of a plurality of second sample containers and to an other of the plurality of second sample containers, and
control the robotic arm to transport the one of the plurality of second sample containers to a first pretreatment group of the plurality of sample pretreatment devices and to transport the other of the plurality of second sample containers to a second pretreatment group of the plurality of sample pretreatment devices.

2. The sample pretreatment apparatus according to claim 1, wherein the plurality of sample pretreatment devices comprise at least one of:
an information attaching device that attaches identification information to the one and the other of the plurality of second sample containers;
a centrifuge;
a closing device that closes a lid of each of the one and the other of the plurality of second sample containers;
a reagent dispenser that dispenses a reagent;
a heater that heats the sample dispensed into each of the one and the other of the plurality of second sample containers; and
a nucleic acid extracting device that extracts a nucleic acid from the sample dispensed into each of the one and the other of the plurality of second sample containers.

3. The sample pretreatment apparatus according to claim 2, the controller is programed to, in response to determining that the first measurement is a cell morphology measurement, control the robotic arm to transport the one of the plurality of second sample containers to the first pretreatment group of the plurality of sample pretreatment devices comprising at least the centrifuge.

4. The sample pretreatment apparatus according to claim 2, the controller is programed to, in response to determining that the first measurement is a biomarker measurement, control the robotic arm to transport the one of the plurality of second sample containers to the first pretreatment group of the plurality of sample pretreatment devices comprising at least the closing device.

5. The sample pretreatment apparatus according to claim 2, wherein the controller is programed to, in response to determining that the first measurement is a visual measurement, control the robotic arm to transport the one of the plurality of second sample containers to the first pretreatment group of the plurality of sample pretreatment devices comprising at least the centrifuge.

6. The sample pretreatment apparatus according to claim 2, wherein the controller is programed to, in response to determining that the first measurement is a measurement of a substance to be expressed on a surface of a cell, control the robotic arm to transport the one of the plurality of second sample containers to the first pretreatment group of the plurality of sample pretreatment devices comprising at least the reagent dispenser that dispenses the reagent that activates the substance.

7. The sample pretreatment apparatus according to claim 2, wherein the controller is programed to, in response to determining that the first measurement is a measurement of gene mutation in a cell, control the robotic arm to transport the one of the plurality of second sample containers to the first pretreatment group of the plurality of sample pretreatment devices comprising at least: the reagent dispenser that dispenses the reagent that dissolves the cell; the heater; and the nucleic acid extracting device.

8. The sample pretreatment apparatus according to claim 2, wherein the controller is programed to, in response to determining that the first measurement is a measurement of a protein in a cell, control the robotic arm to transport the one of the plurality of second sample containers to the first pretreatment group of the plurality of sample pretreatment devices comprising at least the reagent dispenser that dispenses ethanol, and the centrifuge.

9. The sample pretreatment apparatus according to claim 1, further comprising a reader that is configured to read identification information from the first sample container, wherein
the plurality of sample pretreatment devices comprise an information attaching device that is configured to attach identification information based on the identification information read by the reader, and
the controller is programed to control the reader to read the identification information from the first sample container and control the information attaching device to attach identification information based on the identification information read by the reader to the one of the plurality of second sample containers and to the other of the plurality of second sample containers.

10. The sample pretreatment apparatus according to claim 1, wherein
the hand includes a pair of container holding parts that are capable of holding each of the first sample container and the second sample containers, wherein a shape or a size of the first sample container is different from that of the plurality of second sample containers.

11. The sample pretreatment apparatus according to claim 1, wherein
the sample dispenser comprises:
a plurality of dispensing pipettes; and
a driving mechanism that is coupled to the plurality of dispensing pipettes and drives the plurality of dispensing pipettes concurrently, and
the robotic arm operates the driving mechanism with the hand to concurrently dispense samples from two or more first sample containers to two or more of the plurality of second sample containers.

12. The sample pretreatment apparatus according to claim 1, further comprising a supplying part from which the first sample container in which the sample is accommodated is to be supplied, wherein
the controller is programed to control the robotic arm to transport the first sample container from the supplying part to the sample dispenser.

13. The sample pretreatment apparatus according to claim 1, wherein the robotic arm is configured to hold and transport a dispensing pipette to the sample dispenser, wherein the controller is programed to control the sample dispenser to dispense the sample via the dispensing pipette.

14. The sample pretreatment apparatus according to claim 13, wherein the robotic arm is configured to attach the dispensing pipette to the sample dispenser and to detach the dispensing pipette from the sample dispenser, and
the controller is programed to control the robotic arm to attach the dispensing pipette to the sample dispenser and to detach the dispensing pipette from the sample dispenser.

15. The sample pretreatment apparatus according to claim 1, further comprising:
an agitator that agitates the sample in the first sample container; and
an opening device that opens a lid of the first sample container, wherein
the controller is programed to control the robotic arm to transport the first sample container containing the sample agitated by the agitator to the opening device, and to transport the first sample container whose lid is opened by the opening device to the sample dispenser.

16. The sample pretreatment apparatus according to claim 1, comprising the robotic arm and a second robotic arm that includes an articulated arm member and a hand attached to the articulated arm member of the second robotic arm.

17. The sample pretreatment apparatus according to claim 16, wherein the articulated arm member of each of the robotic arm and the second robotic arm comprises a first link member that is turnable about a first axis with respect to a base for the articulated arm member, and a second link member that is connected to the first link member such that the second link member is turnable about a second axis different from the first axis with respect to the first link member.

18. The sample pretreatment apparatus according to claim 1, wherein
the controller is programed to control the robotic arm, based on a coordinate position of any of the plurality of sample pretreatment devices as a transport destination, so that the robotic arm transports the second sample container to the sample pretreatment devices.

19. A sample pretreatment method using a robotic arm, the sample pretreatment method comprising:
dispending, in response to determining that a sample in a first sample container is subject to first and second measurements different from each other, the sample in the first sample container into one of a plurality of second sample containers and an other of the plurality of second sample containers by a dispenser; and
transporting the one of the plurality of second sample container containers to a first pretreatment group by the robotic arm and transporting the other of the plurality of second sample container containers to a second pretreatment group by the robotic arm.

* * * * *